(12) United States Patent
LaBarge et al.

(10) Patent No.: US 10,230,182 B2
(45) Date of Patent: Mar. 12, 2019

(54) ELECTRICAL GROUNDING SYSTEMS

(71) Applicant: GLXT HOLDINGS, LLC, Blue Ridge, GA (US)

(72) Inventors: Thomas Evan LaBarge, Blue Ridge, GA (US); Gordon Wysong, Gainesville, GA (US)

(73) Assignee: GLxT Holdings, LLC, Blue Ridge, GA (US)

(*) Notice: Subject to any disclaimer, the term of this patent is extended or adjusted under 35 U.S.C. 154(b) by 0 days.

(21) Appl. No.: 15/838,154

(22) Filed: Dec. 11, 2017

(65) Prior Publication Data
US 2018/0254569 A1    Sep. 6, 2018

Related U.S. Application Data

(60) Provisional application No. 62/466,687, filed on Mar. 3, 2017.

(51) Int. Cl.
*H02B 1/06* (2006.01)
*H01R 4/66* (2006.01)
(Continued)

(52) U.S. Cl.
CPC .......... *H01R 4/66* (2013.01); *H02G 5/00* (2013.01); *H02G 13/40* (2013.01); *E21B 7/26* (2013.01);
(Continued)

(58) Field of Classification Search
CPC ... H01R 4/66; H02B 5/01; H02G 9/00; H02G 9/10; E21B 7/26
(Continued)

(56) References Cited

U.S. PATENT DOCUMENTS 3,930,111 A    12/1975 Sheelor
4,235,688 A    11/1980 Sudrabin et al.
(Continued)

FOREIGN PATENT DOCUMENTS

WO    2001037377    5/2001
WO    2006081377    8/2006
(Continued)

OTHER PUBLICATIONS

LaBarge, Thomas Evan; International Search Report for PCT Application No. PCT/US18/19078, filed Feb. 22, 2018, dated May 3, 2018, 16 pgs.
(Continued)

*Primary Examiner* — Binh B Tran
(74) *Attorney, Agent, or Firm* — Taylor English Duma LLP

(57) ABSTRACT

An electrical grounding system can include an electrically conductive column configured for communication with a fault current source and a carbon fiber layer in conductive relationship with at least a portion of the electrically conductive column. The system can also include a salt replenishment tube configured for attachment to a ground member, the salt replenishment tube having a tube wall defining a weep hole. The system can further include electrolytic fill disposed within a column chamber at least partially-defined by the electrically-conductive column, the electrolytic fill comprising a material configured to conduct at least a portion of any fault current received by the ground member radially outwardly from the ground member. The system can further include a bus bar comprising electrically-interconnected bus bar connectors, wherein the bus bar electrically communicates with the electrically conductive column and with the fault current source.

31 Claims, 21 Drawing Sheets

(51) Int. Cl.
- H02G 13/00 (2006.01)
- H02G 5/00 (2006.01)
- H02G 9/10 (2006.01)
- E21B 7/26 (2006.01)
- H02G 9/00 (2006.01)
- H02B 5/01 (2006.01)

(52) U.S. Cl.
CPC .......... H02B 5/01 (2013.01); H02G 9/00 (2013.01); H02G 9/10 (2013.01)

(58) Field of Classification Search
USPC ...... 174/5 R, 5 SB, 5 SG, 6, 7, 37; 405/231, 405/249; 175/23
See application file for complete search history.

(56) References Cited

U.S. PATENT DOCUMENTS

| | | | |
|---|---|---|---|
| 4,448,264 A | 5/1984 | Peyton | |
| 4,495,990 A * | 1/1985 | Titus et al. | E21B 43/2401 166/248 |
| 4,688,969 A | 8/1987 | Bruser et al. | |
| 5,036,164 A | 7/1991 | Schrader et al. | |
| 5,086,849 A | 2/1992 | Dahl | |
| 5,415,768 A * | 5/1995 | Andelman | B01D 15/36 204/600 |
| 5,921,591 A | 7/1999 | Argent | |
| 6,288,372 B1 * | 9/2001 | Sandberg | H05B 3/56 219/544 |
| 6,683,779 B2 | 1/2004 | Ober | |
| 6,846,204 B2 | 1/2005 | Oda | |
| 8,081,415 B2 | 12/2011 | Nolletti | |
| 8,602,689 B1 | 12/2013 | Van Polen et al. | |
| 9,252,503 B2 | 2/2016 | Nolletti | |
| 9,444,232 B2 | 9/2016 | Warren | |
| 9,775,223 B2 | 9/2017 | Steinberg et al. | |
| 2008/0002327 A1 | 1/2008 | Woo et al. | |
| 2009/0004895 A1 | 1/2009 | Duley | |
| 2010/0064612 A1 | 3/2010 | Wilson et al. | |
| 2011/0041944 A1 * | 2/2011 | Duquette et al. | F16L 9/147 29/428 |
| 2011/0237140 A1 | 9/2011 | Cerasale | |
| 2015/0359077 A9 | 12/2015 | Steinberg et al. | |
| 2016/0006222 A1 | 1/2016 | Warren | |

FOREIGN PATENT DOCUMENTS

| | | |
|---|---|---|
| WO | 2015156984 | 10/2015 |
| WO | 2018160417 | 9/2018 |

OTHER PUBLICATIONS

E&S Grounding Solutions; Brochure entitled: "Grounding Safety and Electrical Engineering Services", publicly available prior to Dec. 11, 2017, 9 pgs.

epanorama.net; Article entitled: "Why Grounding Is Used?", accessed on Feb. 10, 2017, 3 pgs.

ERI—Electronics Research, Inc.; "Structural Components and Accessories", dated Sep. 24, 2013, 1 pg.

IEEE—The Institute of Electrical and Electronics Engineers, Inc.; "The Authoritative Dictionary of IEEE Standard Terms, 7th ed.", dated Dec. 2000, definitions of "ground" and "ground rod," 5 pgs.

Lyncole XIT® Grounding; Article entitled: "Lyncole XIT® Electronic Grounding System Features", accessed on Jul. 11, 2017, 3 pgs.

videooftheweekdotcom: "Zooming in on Carbon Fiber", located at <https://www.youtube.com/watch?v=Vjyjdj-5S5E>, published Sep. 27, 2010, 1 pg.

Vijayaraghavan, et al.; "Practical Grounding, Bonding, Shielding and Surge Protection", Newnes, Copyright 2004, 19 pgs.

Uman, Martin A.; "The Art and Science of Lightning Protection", Cambridge University Press, Copyright 2008, 15 pgs.

ALLTEC Global; Web page entitled: "Ground Enhancing Backfill", publicly available prior to Dec. 11, 2017, 6 pgs.

ALLTEC Global; Sheet for TF-50XT and TF-50DS "Enhanced Composite Backfill", publicly available prior to Dec. 11, 2017, 1 pg.

ALLTEC Global; Sheet for TF-50 "Grounding Enhancing Backfill—Low Resistivity Grounding Backfill", publicly available prior to Dec. 11, 2017, 1 pg.

Stockin, David R.; "National Electrical Code, 2014, Grounding & Earthing Handbook", McGraw-Hill, Copyright 2014, 23 pgs.

Pentair; Brochure entitled: "GEM—Ground Enhancement Material", Copyright 2010, 2013-2015, 4 pgs.

Dexmet Corporation; Brochure entitled: "Lightning Strike Protection", publicly available prior to Mar. 3, 2017, 4 pgs.

Labarge, Thomas Evan; Notice of Allowance for U.S. Appl. No. 16/127,434, filed Sep. 11, 2018, dated Nov. 30, 2018, 13 pgs.

* cited by examiner

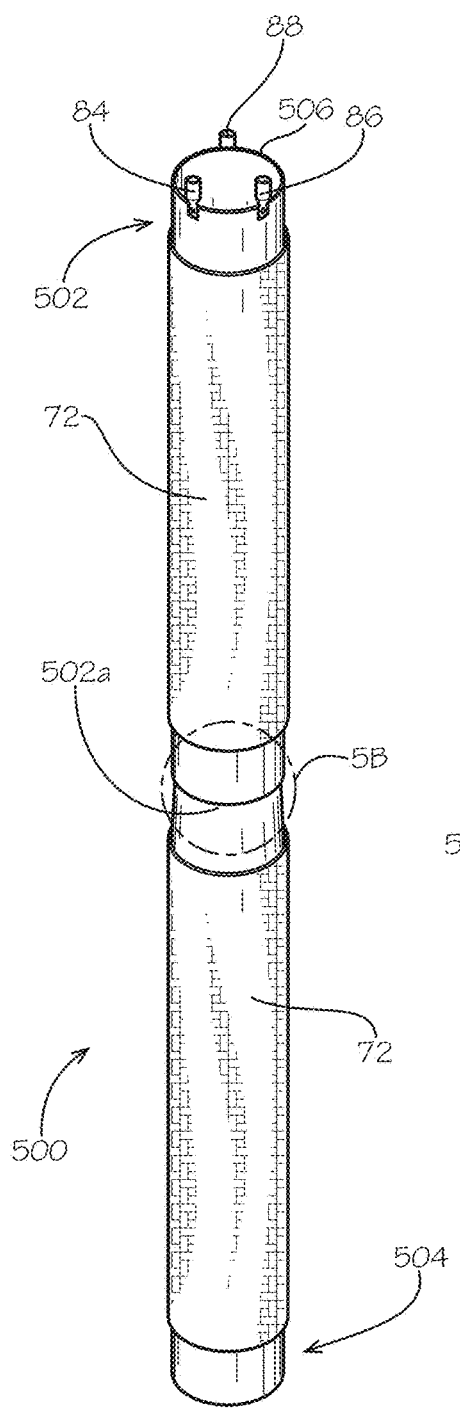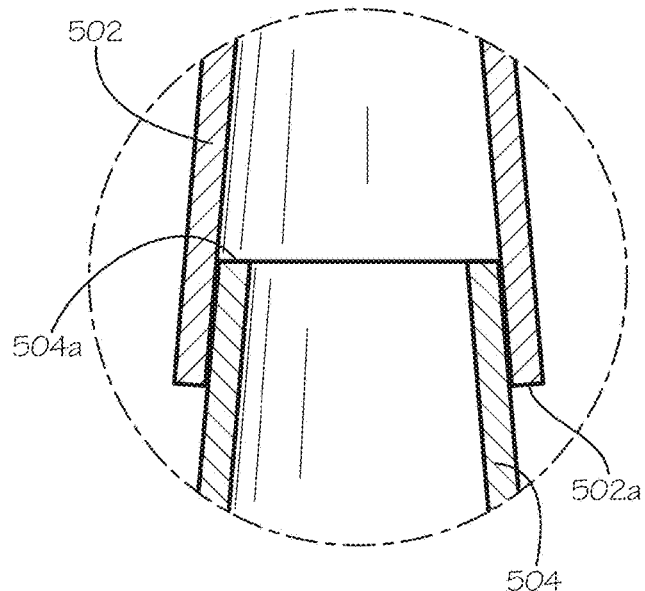
FIG. 5B
FIG. 5A

ELECTRICAL GROUNDING SYSTEMS

CROSS-REFERENCE TO RELATED APPLICATION

This application claims the benefit of U.S. Provisional Patent Application Ser. No. 62/466,687, filed Mar. 3, 2017, the disclosure of which is hereby incorporated by reference herein in its entirety.

TECHNICAL FIELD

This disclosure relates to electrical grounding systems. More specifically, this disclosure relates to improvements in systems employing ground electrodes.

BACKGROUND

A "ground" is an electrical connection between a circuit or equipment and the earth or a large conducting body that serves in place of the earth. "Grounding" an electrical system is installing a ground in the electrical system. The safe return of errant current (also called "fault current") to the earth without damage to life or devices is an important concern of businesses, utilities, and homeowners. When a ground fails, valuable assets can be destroyed and people can be injured or killed. In the United States, the National Electric Code (NEC) requires a protective ground to prevent voltage build-up from a lightning strike, short in a circuit path, or insulation failure that would otherwise cause electrical shock, injury, or death. In an industrial setting, the absence of a very low-resistance grounding path can cause a build-up of static electricity which, in turn, can introduce noise into communication and transmission circuits and can present a danger when handling flammable materials. Grounds protect electrical equipment or systems from reaching excessive voltage by providing an alternate path for current to travel (other than through an electrical circuit in the equipment). Grounding is also valuable for preventing electric shock hazards. A neutral wire connecting electrical equipment to a ground system of a structure prevents development of large voltage differences between the neutral line and a ground line leading from the ground pin of a plug to the chassis of the equipment.

Ground rods, also known as ground electrodes, are typical mechanisms for establishing a ground connection to earth. Rods constructed of copper or iron, each typically having an 8-foot length, are driven into the ground and then electrically connected to a source of the current that is sought to be grounded (fault current source). Such rods cannot be used in all types of terrain because in some areas, the soil depth is much less than 8 feet, so in such areas horizontal grounding grids (comprising ground rods buried horizontally) are used to cover large areas. Such grounding grids are less reliable than ground rods because when a grounding element such as a grid or rod is buried horizontally, almost half of the grounding capacity is wasted, as the surface area of the element facing upwardly in the soil will only be able to affect the conductivity of the little soil that is above the buried element. Another drawback of existing systems concerns variances in soil moisture. Ground rods typically need to interact with some moisture to be effective. However, some soils can be situated in arid environments, or areas experiencing a drought, and in those cases, ground rods are typically not able to function as intended. Furthermore, different sites have different compositions as well as different soil depths. For example, soil near a coastline can have brackish water in it, which can conduct current at a very low resistance (between one and two ohms), whereas only around 10 miles inland, the soil often lacks brackish water and the resistance can radically increase to as much as several hundred ohms. Such differing conditions have often caused each installation of a grounding system to be specifically designed for each site, with little or no uniformity between installations at different sites.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In an aspect of the present disclosure, an electrical grounding system comprises an electrically conductive column configured for communication with a fault current source and a carbon fiber layer in conductive relationship with at least a portion of the electrically conductive column. The electrically conductive column has an exterior surface, a cross-section of the electrically conductive column defining a perimeter of the exterior surface, and the carbon fiber layer can surround the perimeter. The electrical grounding system can further comprise a salt replenishment tube configured for attachment to a ground member, the salt replenishment tube having a tube wall defining an interior surface and an exterior surface, the interior surface of the tube wall defining a tube chamber, wherein the tube wall defines a weep hole extending from the exterior surface of the tube wall, through the tube wall, and into the tube chamber. Electrolytic salt can be disposed within the tube chamber, wherein the weep hole is configured to provide a passageway for the electrolytic salt, during use of the system, to leach from the tube chamber and into a column chamber at least partially-defined by the electrically conductive column.

In another aspect of the present disclosure, a method of installing an electrical grounding system at a site can comprise the steps of inserting a hollow electrode into a hole formed into native soil at the site, the hollow electrode comprising an electrically conductive tube configured for communication with a fault current source, and a carbon fiber layer in conductive relationship with at least a portion of the electrically conductive tube; positioning the hollow electrode in the hole circumferentially around a ground member driven into native soil at a bottom of the hole; and electrically interconnecting the ground member and the hollow electrode.

In yet another aspect of the present disclosure, an electrical grounding system kit can comprise a hollow electrode comprising an electrically conductive tube configured for communication with a fault current source, and a carbon fiber layer assembled onto at least a portion of the electrically conductive tube; and a bus bar comprising at least two bus bar connectors electrically interconnected to one another. The kit can further comprise a salt replenishment tube assembly positioned inside the hollow electrode during shipment of the electrical grounding system kit, the salt replenishment tube assembly comprising a salt replenishment tube having opposed ends and a tube wall defining an interior surface and an exterior surface, the interior surface defining a tube chamber, wherein the tube wall defines a weep hole extending from the exterior surface of the tube wall, through the tube wall, and into the tube chamber; electrolytic salt disposed within the tube chamber; a cap received on each end of the salt replenishment tube to retain the electrolytic salt within the tube chamber; and water-soluble tape placed over the weep hole, the water-soluble tape configured to prevent escape of the electrolytic salt out of the tube chamber through the weep hole during shipment; whereby the salt replenishment tube assembly is configured such that, during use of the electrical grounding system, the water-soluble tape dissolves over time to allow the electrolytic salt to leach from the tube chamber, through the weep hole, and into space external to the salt replenishment tube.

Various implementations described in the present disclosure can comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations can be realized and obtained by means of the systems, methods, features particularly pointed out in the appended claims. These and other features will become more fully apparent from the following description and appended claims, or can be learned by the practice of such exemplary implementations as set forth hereinafter.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 5A is a perspective view of a grounding system electrode according to another aspect of the present disclosure, with two electrically conductive columns shown joined end-to-end.

FIG. 5B is a cross-sectional detail of the junction between the two electrically conductive columns taken from detail 5B in FIG. 5A.

DETAILED DESCRIPTION

Figure 1:
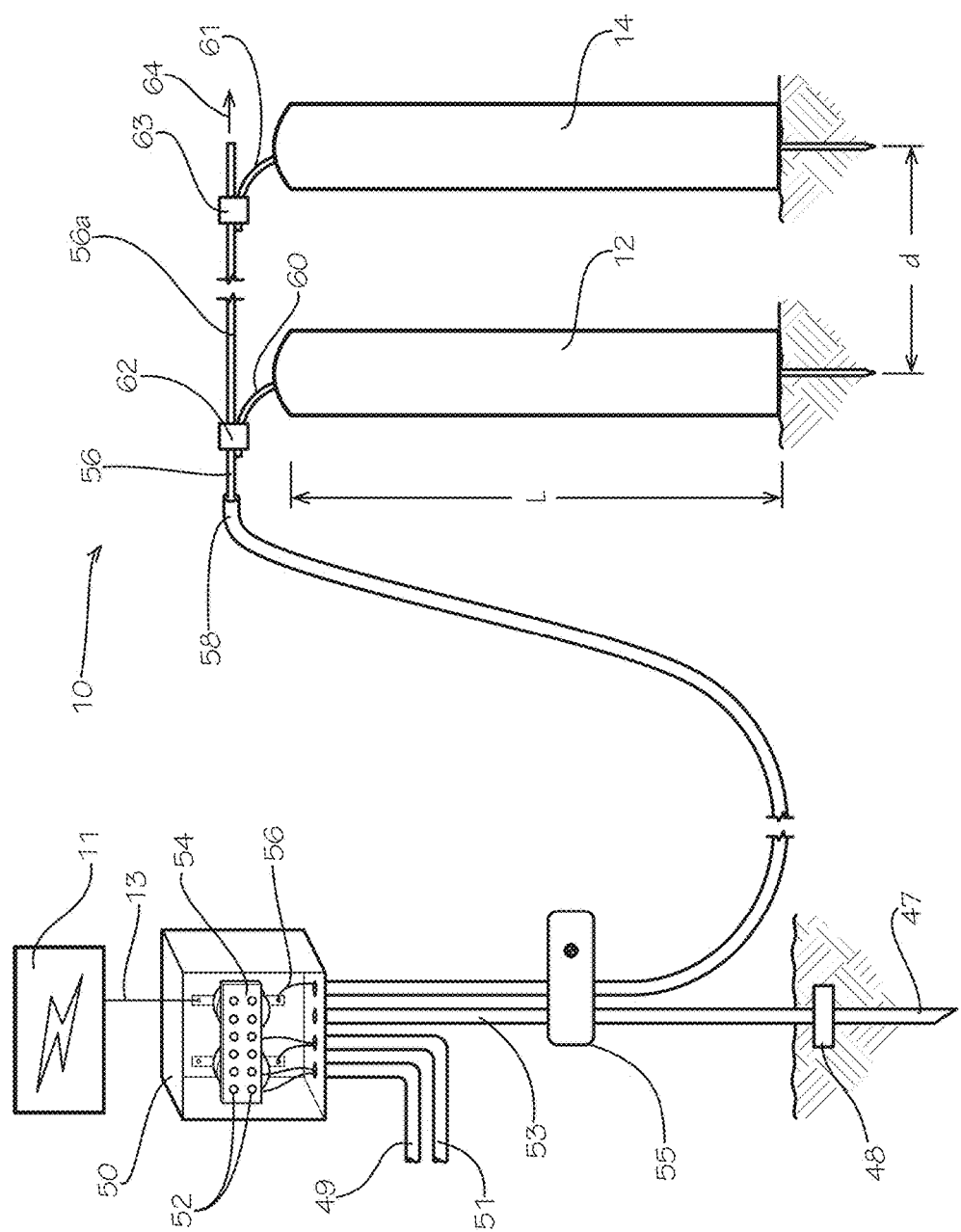
FIG. 1 is a perspective view of an electrical grounding network comprising spaced electrical grounding systems in accordance with an aspect of the present disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the present disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "top," "bottom," "side," "upper," "lower," "horizontal," and/or "vertical" may be referenced. Unless stated otherwise, "top" describes that side of the system or component that is facing upward and "bottom" is that side of the system or component that is opposite or distal the top of the system or component and is facing downward. Unless stated otherwise, "side" describes that an end or direction of the system or component facing in horizontal direction. "Horizontal" or "horizontal orientation" describes that which is in a plane aligned with the horizon. "Vertical" or "vertical orientation" describes that which is in a plane that is angled at 90 degrees to the horizontal.

Disclosed is an electrical grounding system designed to overcome the drawbacks discussed above and to provide a system that achieves results superior to those of conventional grounding systems, and at reduced cost. Implementations of the disclosed electrical grounding system provide uniformity of grounding system components, simplifying grounding installations. The enhanced performance of the disclosed system is accomplished with less electrically conductive material (such as copper) than that used in conventional grounding networks. Thus, the disclosed system provides enhanced performance at less cost, both in terms of labor and materials. These and other benefits are attendant to the electrical grounding system disclosed herein.

FIG. 1 illustrates a grounding site at which an electrical grounding network 10 has been installed. Network 10 can comprise a pair of electrical grounding systems 12, 14 shown only generally as outlines, with structural details of the systems 12, 14 to be discussed herein. Network 10 could include more than two electrical grounding systems or only one such system, depending, for example, on grounding requirements for the site. Each electrical grounding system 12, 14 can be constructed identically according to any of the aspects of the present disclosure, to be discussed in detail herein. The systems 12, 14 are separated from one another by a predetermined distance "d," which can be dictated by applicable codes. For example, denoting the length of system 12 as L, the minimum distance "d" can be required to be of magnitude 2L in some aspects. Ground wires 49,51,53 can originate at a structure or electrical system (not shown) for which grounding is desired and are shown entering a securable enclosure such as a meter box 50. Inside the meter box 50, the ground wires 49,51,53 can be connected with suitable lugs 52 to a meter box bus bar 54, which can be constructed of a solid copper bar in various aspects. The ground wires 49,51,53 represent wires that ground electrical networks separate from the grounding network 10; for example, one of the ground wires 49 can ground a home entertainment system, while another ground wire 51 can ground one or more home appliances. Ground wire 53 is shown being attached via a mechanical attachment 48 to a conventional ground rod 47 as a representative example of a conventional grounding network component distinct from grounding network 10. The connection of the ground wires 49,51,53 to the meter box bus bar 54 can alternatively be accomplished with soldering or welding or any other desired method in other aspects. Also connected to the meter box bus bar 54 is stranded wire 56, which represents a ground wire for a separate fault current source, symbolically represented at 11. Fault current source 11 can be an active circuit with electrical current running through it, such as a circuit of another electrical system inside the structure, or it can be lightning that strikes the structure or native soil in the vicinity of the structure that causes a sufficiently strong surge in the electrical system of the structure to transmit current into stranded wire 56, which can be AWG (American Wire Gauge) #4 stranded wire. Fault current source 11 electrically communicates with stranded wire 56 via a current path shown symbolically at 13, which represents any path taken by fault current to reach the stranded wire 56. The stranded wire 56, which serves as a lead for the grounding network 10, is electrically interconnected via the meter box bus bar 54 to the other grounding networks for the structure, in accordance with Section 250.94 of the NEC. Alternatively, if the separate grounding systems are not already interconnected inside the meter box 50 with mechanisms such as the meter box bus bar 54, an inter-system bonding termination block (IBTB) 55 can be used to electrically interconnect the separate grounding networks. The IBTB 55 can be a commercially-available item sold by, for example, Value Tech Supply as Item No. 90588. More modern structures can already have an IBTB 55 mounted on a wall for outside access; however, in case a site is not so equipped, an IBTB 55 can be supplied as part of a kit in accordance with an implementation of some aspects of the present disclosure, described later herein with regard to FIG. 15. The stranded wire 56 exiting the meter box 50 can be carried in a conduit or casing 58 for a predetermined distance. In various aspects, one example of connections of stranded wire 56 to grounding systems 12, 14 can comprise stranded wire extensions 60, 61, which can be attached at one of their respective ends to the stranded wire 56 with attachment lugs 62, 63, respectively. However, as will be discussed herein, such electrical connections to grounding systems can be accomplished with different configurations in different implementations of a grounding system according to various other aspects of the present disclosure. In the example of FIG. 1, the attachment lugs 62, 63 can be secured in place with compression and silver solder. Arrow 64 indicates that the stranded wire 56 can be connected to additional electrical grounding systems as necessary or desired to achieve further reduction in the electrical resistance of the site soil. Proximate their respective free ends opposite the attachment lugs 62, 63, the stranded wire extensions 60, 61 can be attached to bonding lugs of the electrical grounding systems 12, 14, respectively. (An example of a bonding lug is discussed with regard to FIG. 16 at 1646.) The systems 12, 14 can thus be electrically connected not only to the fault current source 11, but also to one another. In the arrangement shown in FIG. 1, electrical current to be grounded can be transmitted from the fault current source 11 to each grounding system 12, 14 by the stranded wire 56. Some of the fault current from stranded wire 56 can be diverted to the electrical grounding system 12, for example, via stranded wire extension 60, and undiverted fault current remaining in stranded wire extension 56a can be subject to further diversion into the electrical grounding system 14 via stranded wire extension 61.

Figure 2:
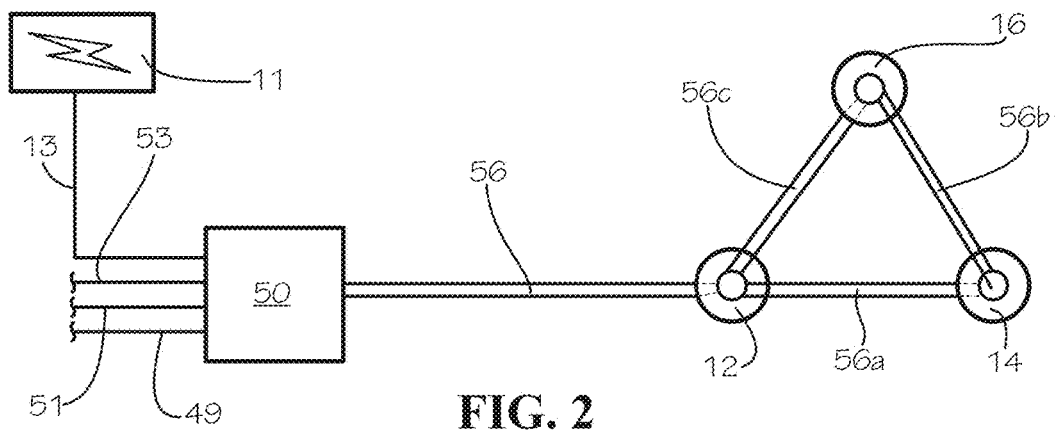
FIG. 2 is a top view of the example installation depicted in FIG. 1, showing three electrical grounding assemblies arranged in a triangle (delta) formation.

FIG. 2 illustrates that electrical grounding network 10 can comprise not only first and second electrical grounding systems 12, 14, respectively, but also a third electrical grounding system 16 that can be constructed identically to the systems 12, 14. Each of the grounding systems 12,14,16 can be separated from one another by the distance "d" in a delta, or triangle, configuration. When more than one system is installed, the hole dug into native soil to accommodate a first system can be extended into a trench (for the distance "d," for example) to accommodate another such system. Each of the grounding systems 12,14,16 is shown being electrically interconnected to one another by extensions 56a, 56b, and 56c of stranded wire 56. The example FIG. 2 is merely illustrative, and an electrical grounding network with electrical grounding systems of the type constructed in accordance with aspects of the present disclosure can use any suitable number of such systems in any configuration suitable for particular characteristics of the site to be grounded.

Figure 3:
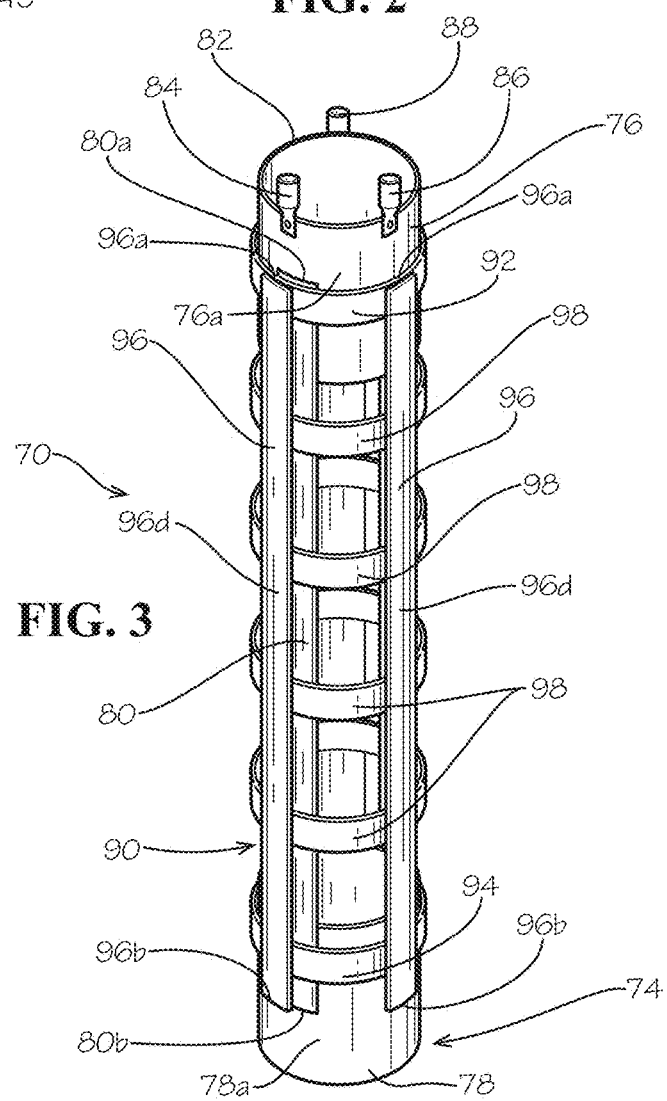
FIG. 3 is a perspective view of a single, partially-completed electrode subassembly according to an aspect of the present disclosure.
Figure 4:
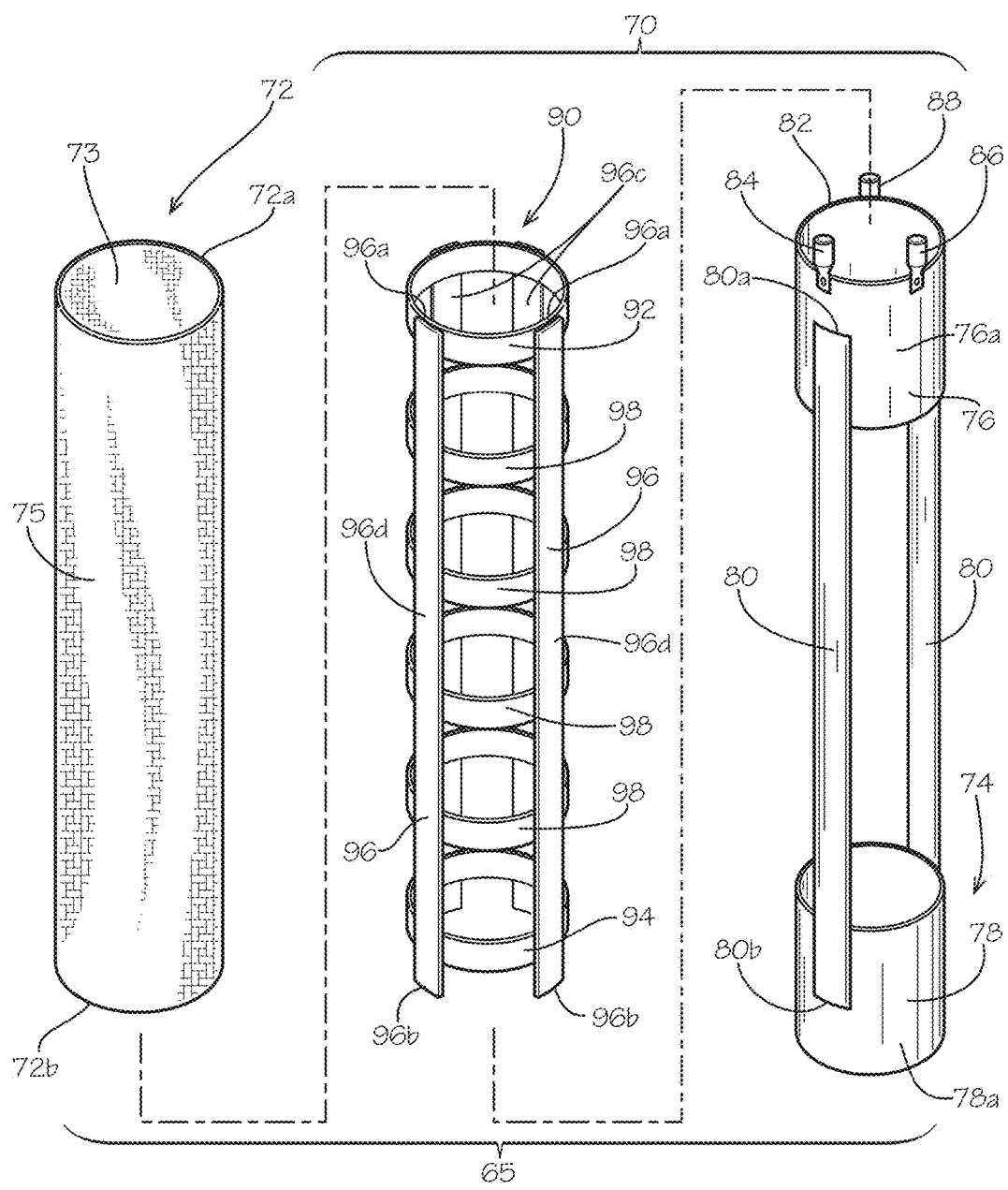
FIG. 4 is a perspective view of components of the electrode subassembly illustrated in FIG. 3, shown in exploded relation to one another and to a roll of carbon fiber fabric.

FIG. 3 shows a partially completed subassembly 70 of one aspect of a grounding system electrode 65 that is shown in FIG. 4. FIG. 4 shows two principal subassembly components of the grounding system electrode 65 in relation to one another and in relation to a roll of carbon fiber fabric 72 of the grounding system electrode 65. Referring to FIG. 3, the subassembly 70 includes an electrically conductive column 74 configured for communication with the fault current source 11 (FIG. 1). The column 74 can comprise an upper tube section 76 defining an exterior surface 76a, a lower tube section 78 defining an exterior surface 78a, and at least one spine 80 having opposed ends 80a, 80b, with end 80a of the spine 80 connected to the upper tube section 76, and end 80b of the spine 80 connected to the lower tube section 78. The tube sections 76, 78 and the spine 80 can all be constructed of any suitable electrically conductive material, such as copper, and spine 80 can be attached to the tube sections 76, 78 in any suitable manner, such as spot welding, that enables electrical communication between the spine 80 and the tube sections 76, 78. Upper tube section 76 has an end 82 and column lugs 84,86,88 attached to the upper tube section 76 proximate end 82 by any suitable mechanisms, such as riveting, that permits electrical communication between the upper tube section 76 and each of the column lugs 84,86,88. The column lugs 84,86,88 can be separated from one another by 120° of circumference. The column lugs 84,86,88 are commercially-available hardware pieces made of electrically conductive material, with open ends opposite their fixed attachment points, the ends designed to receive a respective wire, or cable, and upon such receipt, to be crimped about the end of the wire/cable to provide a secured mechanical and electrical connection to the wire/cable. Column lugs 84,86,88 can be used for wiring attachments in the manner to be described herein with regard to FIGS. 9 and 10.

As shown in FIGS. 3 and 4, subassembly 70, and thus the grounding system electrode 65, can comprise a fabric support lattice 90 positioned circumferentially around the upper tube section 76 and the lower tube section 78. In particular, fabric support lattice 90 comprises an upper ring 92 positioned circumferentially around the upper tube section 76, a lower ring 94 positioned circumferentially around the lower tube section 78, and at least one elongated member 96 having ends 96a and 96b, defining an inner surface 96c (shown in FIG. 4) and an outer surface 96d, the inner surface 96c of the elongated member 96 connected to the upper ring 92 proximate end 96a of the elongated member 96, and the inner surface 96c of the elongated member 96 connected to the lower ring 94 proximate end 96b of the elongated member 96. FIGS. 3 and 4 show the fabric support lattice 90 as having four elongated members 96, though a greater or a lesser number of such members can be used. The fabric support lattice 90 can further comprise intermediate rings 98 joined to or otherwise contacting portions of the inner surface 96c of the elongated member 96 axially intermediate the upper ring 92 and the lower ring 94. The fabric support lattice 90 can be constructed of any suitable material, which need not be electrically conductive, such as cardboard.

Referring to FIG. 4, electrode 65 can further comprise a carbon fiber layer in the form of a roll of carbon fiber fabric 72 having edges 72a, 72b, an inner face 73, and an outer face 75. The inner face 73 of the carbon fiber fabric 72 can contact at least a portion of the outer surface 96b of the elongated member 96 so that the fabric support lattice 90 aids in imparting a cylindrical shape to the roll of carbon fiber fabric 72 when the carbon fiber fabric 72 is assembled onto the fabric support lattice 90. In some implementations, the carbon fiber fabric 72 can be secured in place about the fabric support lattice 90 by conductive copper foil tape (adhesive-backed copper foil, not shown) joining a seam formed by the edges of the carbon fiber fabric 72 that meet when the carbon fiber fabric 72 is formed into a roll (cylindrical shape), and by an adhesive applied at appropriate points between the carbon fiber fabric 72 and the fabric support lattice 90. The copper foil tape provides additional electrical contact between the electrically conductive column 74 and the carbon fiber fabric 72 once the unit formed by the combination of carbon fiber fabric 72 and the fabric support lattice 90 is assembled onto the electrically conductive column 74. Although all figures of the present disclosure depict electrodes and some of their associated components as cylindrical in shape (circular cross-sections), in other implementations the electrodes and associated components can assume different cross-sectional shapes. Next, the unit formed by the combination of carbon fiber fabric 72 and the fabric support lattice 90 can be positioned circumferentially around the electrically conductive column 74, such that the inner face 73 of the roll of carbon fiber fabric 72 can contact, or otherwise electrically communicate with, at least a portion of the exterior surface 76a of the upper tube section 76, and at least a portion of the exterior surface 78a of the lower tube section 78. Both the direct contact of the carbon fiber fabric 72 with the electrically conductive column 74 at sections 76,78, and the electrical interconnection between the carbon fiber fabric 72 and those sections provided by conductive material such as the copper foil tape described above, comprise different examples of a conductive relationship between the carbon fiber fabric 72 and the column 74. Thus, a conductive relationship can comprise but does not require such direct contact, so long as the carbon fiber fabric 72 and the column 74 complete an electrical circuit. In other words, the column 74 and the carbon fiber fabric 72 are in a conductive relationship with one another, despite the absence of direct contact between them, if the column 74 is able to transmit electric current, especially fault current, away from its exterior surface (such as surfaces 76a, 78a), through a conductive medium or material, and onto the carbon fiber fabric 72. The carbon fiber fabric 72 is then attached to the exterior surfaces 76a, 78a by suitable fastening methods such as strips of copper tape respectively joining edges 72a, 72b of the carbon fiber fabric 72 to the exterior surfaces 76a, 78a. The carbon fiber fabric 72 can thus surround the perimeter of the exterior surfaces 76a, 76b, with the fabric support lattice 90 sandwiched between, or circumferentially intermediate, the electrically conductive column 74 and the carbon fiber fabric 72. In the implementation of FIG. 4, as well as in all other aspects of the current disclosure that employ a carbon fiber fabric 72, electrical continuity of an electrically conductive column (such as at 74 in FIG. 4) with the carbon fiber fabric 72 can be made by: (1) physical contact of the carbon fiber fabric 72 on the column 74 under subterranean pressure (assisted by the electrolytic characteristics of electrolytic fill, discussed herein with regard to FIG. 10 at 1004); (2) conductive-adhesive copper foil tape joining the column 74 with the carbon fiber fabric 72 at several points along the column 74 (the locations of such points depending upon column configuration); and (3) riveting (such as with copper and brass rivets), for example, a 4-square-centimeter piece of 18-24 gauge copper sheet to the column 74, sandwiching the carbon fiber fabric 72 between the small copper piece and the column 74, thus providing a durable bond between the column 74 and the carbon fiber fabric 72. One copper "tab" is riveted to the column 74 per section of carbon fiber fabric 72.

Figure 7A:
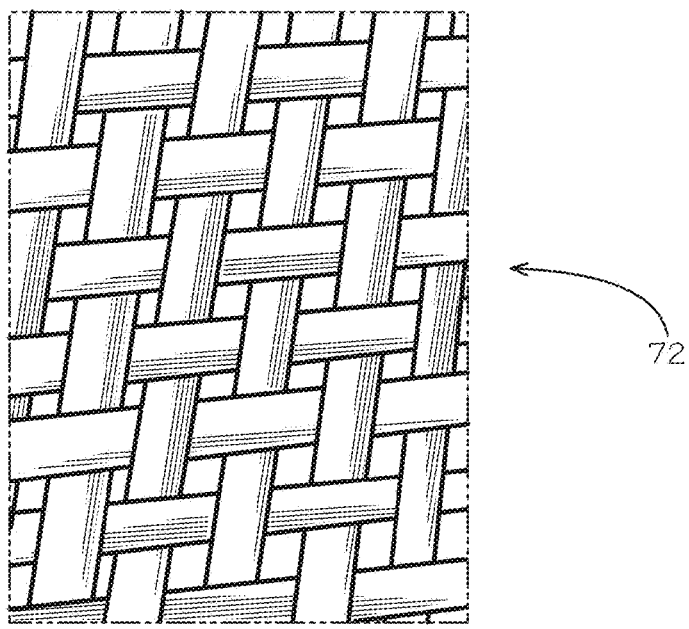
FIGS. 7A and 7B illustrate magnifications of the carbon fiber fabric illustrated in, for example, FIG. 4.
Figure 7B:
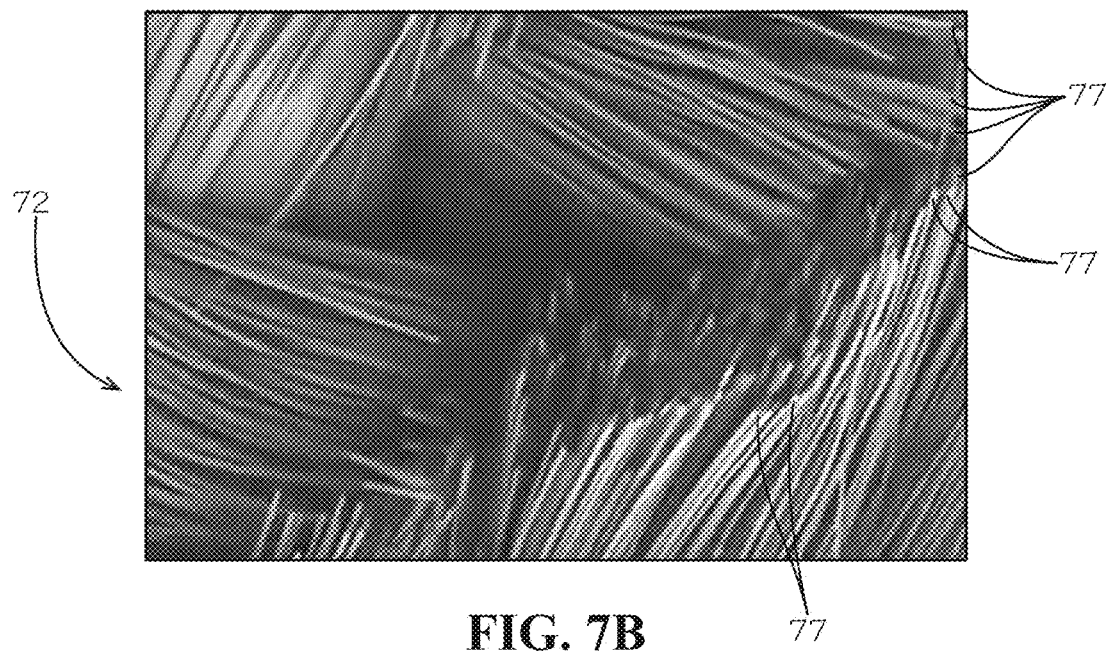

Referring to FIGS. 7A, and 7B, the carbon fiber fabric 72 can be an 8.85-ounce carbon fiber plain weave fabric (the nature of that weave most clearly seen in FIG. 7A) commercially available from, for example, Fiberglass Supply (Seattle, Wash.) under SKU #C53-6370. The carbon fiber fabric 72 is highly conductive and, as more fully appreciated with reference to the higher magnification depicted in FIG. 7B (which shows some carbon fiber strands broken for ease of illustration), is composed of thousands of fiber (or thread) ends 77 in a small area of fabric. Each of these ends 77 is an emitting point for electrons once the electrically conductive column 74 transmits fault current to the carbon fiber fabric 72 in a manner to be discussed herein. Generally, in less than ideal soils, fault current received from a fault current source by a wire or conventional ground rod will remain in that wire or ground rod until the fault current reaches the end of the electrode. By contrast, instead of having just one endpoint (for a ground rod or wire) or a series of endpoints in a ground rod array, the carbon fiber fabric 72 has many thousands of endpoints (ends 77) in an extremely small area, those endpoints 77 arising with each breakage of each fiber. Carbon fiber has an extraordinarily high ratio of surface to volume, and fault currents are known to often run along a surface of a conductive material. When the outer face 75 (FIG. 4) of the carbon fiber fabric 72 is exposed to either native soil or an electrolytic medium within a hole of an installation (to be discussed herein), the thousands of endpoints provide thousands of pathways into that soil or medium, and resistance-to-ground is dramatically reduced compared with other grounding systems on a comparable depth or soil surface area.

Although the implementations of the present disclosure described herein illustrate use of the plain weave carbon fiber fabric 72 of FIG. 7A as the carbon fiber layer, it is to be understood that other implementations of the present disclosure can use other types of carbon fiber layers that are positioned in a conductive relationship with an electrically conductive column. For instance, the carbon fiber layer can take the form of a carbon fiber fabric woven differently from the plain weave of FIG. 7A. The carbon fiber layer can even take the form of loose chopped carbon fiber or rovings (also available from the aforementioned Fiberglass Supply), which could be deposited in proximity to an electrically conductive column (such as, for example, column 512 described in FIG. 5C below) positioned in a hole formed into native soil. The chopped carbon fiber or rovings can optionally be suspended in a suitably conductive matrix. In yet other implementations, the carbon fiber layer can be applied to an outer surface of the electrically conductive column in any suitable manner, such as being sprayed onto that outer surface.

FIGS. 5A and 5B depict a grounding system electrode 500 in accordance with another aspect of the present disclosure. Grounding system electrode 500 comprises two separate electrically conductive columns 502, 504, joined end-to end, each column 502, 504 constructed of a conductive material such as copper. Unlike the column 74 of FIGS. 3 and 4, which is comprised of spaced tubular sections joined by a spine, each column 502, 504 can be formed as a single continuous tube. Each column 502, 504 can form its own separate electrode in areas allowing for only limited hole depth, such as sites with shallow soils. Thus each column 502, 504 can be only two feet in length, for example, to allow burial in such shallow soils. When joined together as shown, they can form a single electrode 500 having a length of around four feet, suitable for most native soils. Upper column 502 has an upper end 506, and column lugs 84,86,88 are attached to the upper column 502 proximate end 506 in the same manner, and for the same purpose, discussed above with regard to FIG. 3. Each column 502, 504 can be wrapped in a respective roll of carbon fiber fabric 72, attached to the columns 502, 504 in the same manner discussed above with regard to FIG. 4. Though not shown in FIG. 5A, each column 502, 504 can also be provided with a fabric support lattice constructed and positioned as shown in FIGS. 3 and 4 at 90. As seen in FIG. 5B, upper column 502 has an end 502a that is outwardly-tapered, while lower column 504 has an end 504a that is inwardly-tapered. This allows end 502a to be press fit over end 504a, providing a secure mechanical and electrical connection between the columns 502, 504.

Figure 5C:
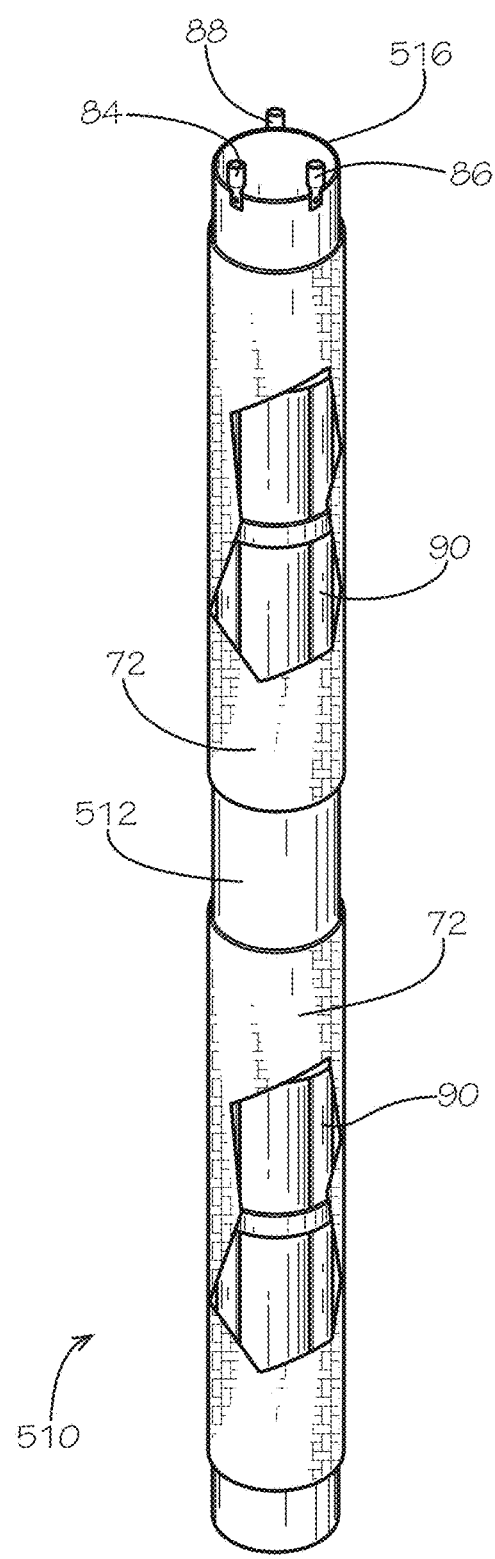
FIG. 5C is a perspective view of a grounding system electrode according to another aspect of the present disclosure, illustrating a single continuous electrically conductive column with two pieces of carbon fiber fabric wrapped around different portions of the column.

FIG. 5C is a perspective view of a grounding system electrode 510 according to another aspect of the present disclosure, illustrating a single continuous electrically conductive column 512, which can be constructed, for example, as a four-foot length of copper tube. Two sections of carbon fiber fabric 72 can be wrapped around different portions of the column 512, attached in the same manner discussed above with regard to FIG. 4. In other implementations, only a single, longer section of carbon fiber fabric 72 can be used in place of the two sections 72 shown in FIG. 5C, such that the central portion of column 512 would not be exposed as shown. Column 512 has an upper end 516, and column lugs 84,86,88 are attached to column 512 proximate upper end 516 in the same manner, and for the same purpose, discussed above with regard to FIG. 3. Additionally, a fabric support lattice 90 can be positioned circumferentially between the column 512 and each piece of carbon fiber fabric 72, in the same manner discussed above with regard to FIGS. 3 and 4.

Figure 5D:
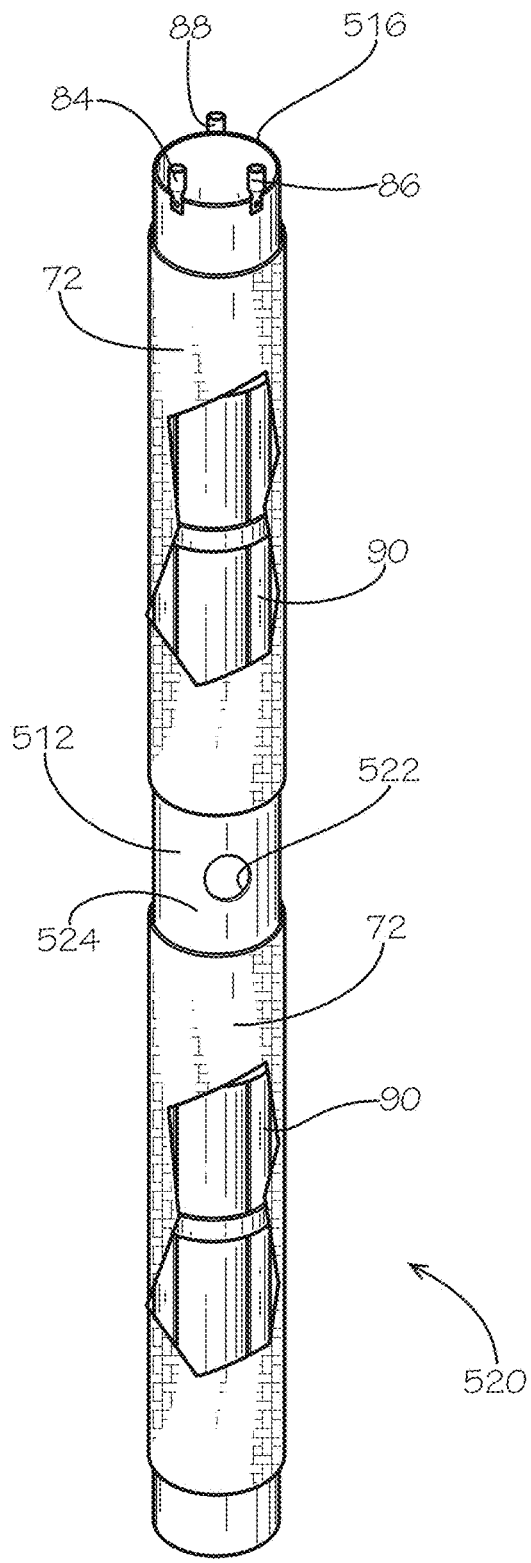
FIG. 5D is a perspective view of a grounding system electrode according to another aspect of the present disclosure, constructed identically to the electrode of FIG. 5C, except adding the feature of a hole configured to admit electrolytic fill in a column chamber when the electrode is installed at a site in a horizontal orientation.

FIG. 5D is a perspective view of a grounding system electrode 520 according to another aspect of the present disclosure, constructed identically to the electrode 510 of FIG. 5C, except adding the feature of a hole 522 defined into a wall 524 of the column 512. Wall 524 defines a column chamber within the interior space of column 512. The hole 522 is configured to admit electrolytic fill into the column chamber (such electrolytic fill to be discussed herein with regard to FIG. 10) when the electrode 520 is installed at a site in a horizontal orientation. A horizontal orientation can be desired for grounding sites that have only rocky native soil, making drilling holes to typical depths prohibitively time-consuming and expensive. If desirable, once the electrode 520 is installed in a horizontal orientation and the electrolytic fill has been added via the hole 522, the installer can opt to plug the hole 522 in any suitable manner.

Figure 6:
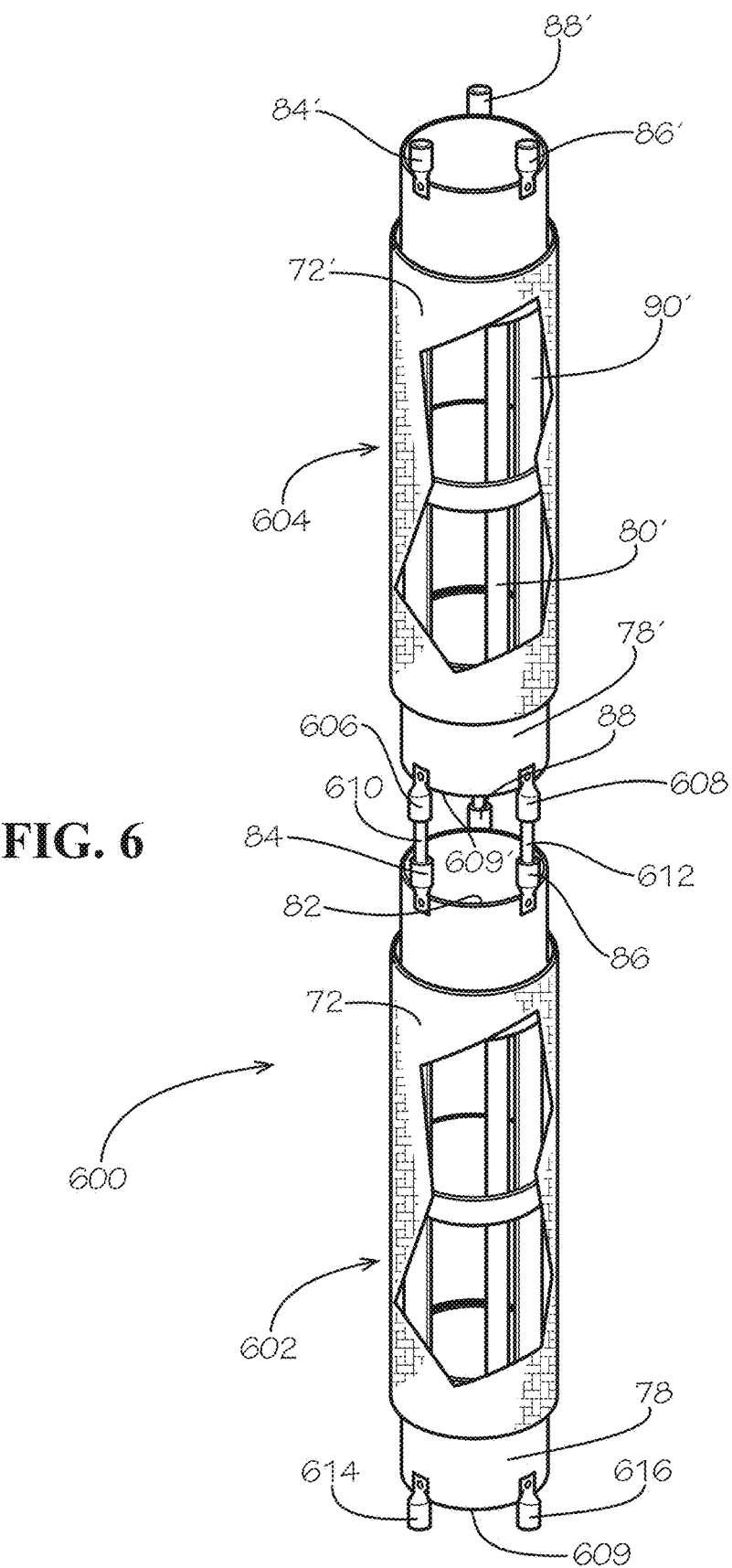
FIG. 6 is a perspective view of a grounding system electrode according to another aspect of the present disclosure, with two electrically conductive columns shown interconnected by cable lugs and cable members.

FIG. 6 is a perspective view of a grounding system electrode 600 according to another aspect of the present disclosure, with two sub-electrodes 602, 604 shown interconnected by cable lugs and cable members. Each sub-electrode 602, 604 is shown constructed identically to electrode 65 (FIGS. 3 and 4) and thus identically to one another (with identical parts among the two sub-electrodes 602, 604 being identified by corresponding primed numerals for sub-electrode 604), with the exception of connection lugs 606, 608 (third connection lug not shown) attached to the lower tube section 78' of sub-electrode 604 proximate the lower end 609' of lower tube section 78'. Alternatively, the electrically conductive column of each sub-electrode 602, 604 can be constructed of a continuous tube, also formed from conductive material such as copper. A first cable member 610 electrically interconnects column lug 84 and connection lug 606, and a second cable member 612 electrically interconnects column lug 86 and connection lug 608. (A similar interconnection, not shown, is provided with respect to column lug 88 of column 602.) Each lug is crimped about a respective end of a cable member received therein to provide a secure mechanical and electrical connection between sub-electrodes 602,604. Optionally, sub-electrode 602 can also be provided with connection lugs 614,616 attached to lower tube section 78 proximate lower end 609, in the event yet another sub-electrode is to be included in electrode 600. However, in most instances inclusion of a third such sub-electrode is not expected to be necessary.

Figures 8, 9:
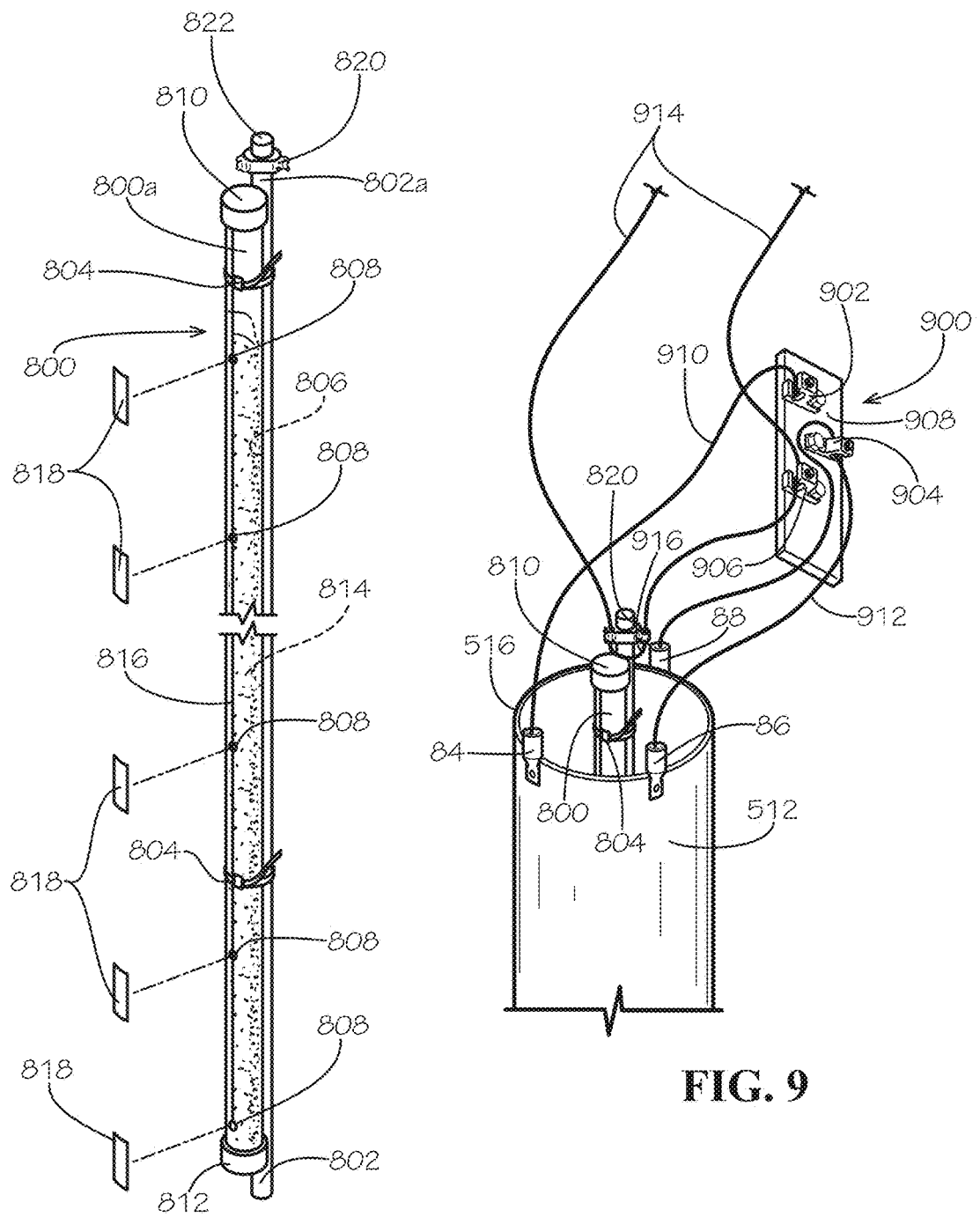
FIG. 8 is a perspective view of a salt replenishment tube and an upper portion of a ground rod, both used in an electrical grounding system according to various aspects of the present disclosure, strapped to one another with fasteners such as zip ties.
FIG. 9 is a detail of lead connections at an upper end of a grounding system electrode according to various aspects of the present disclosure.

FIG. 8 is a perspective view of a salt replenishment tube 800 and an upper portion of a ground member (which can be a ground rod as shown) 802 having an exterior surface 802a, both the salt replenishment tube 800 and the ground rod 802 used in an electrical grounding system according to various aspects of the present disclosure, and strapped to one another with fasteners such as zip ties 804. In an implementation, salt replenishment tube 800 can be constructed of polyvinyl chloride (PVC) but any other suitable material can be used. The ground rod 802 is a conventional grounding member that can be constructed of any conductive material suitable to transmit fault current received from a fault current source 11 (FIG. 1) into native soil receiving the ground rod 802, an example of such material being a copper-clad metal. FIG. 8 shows only an upper portion (an undriven portion in an installation) of the ground rod 802 which in some implementations can have a total length of, for example and without limitation, 2.44 meters (96 in.). The salt replenishment tube 800 can comprise a tube wall defining an interior surface and an exterior surface 800a, the interior surface of the tube wall defining a tube chamber 806, wherein the tube wall defines at least one weep hole 808 extending from the exterior surface of the tube wall, through the tube wall, and into the tube chamber 806. FIG. 8 depicts five such weep holes 808, but any suitable number of such holes can be formed. Additionally, the weep holes 808 do not need to be evenly distributed along the length of the salt replenishment tube 800 as shown; any other suitable distribution can be used. The salt replenishment tube 800 is provided with a removable upper end cap 810 at its upper end and a permanent lower end cap 812 proximate its lower end. Electrolytic salt 814 is disposed within the tube chamber 806, wherein the weep holes 808 are configured to provide passageways for the electrolytic salt 810, during use of the grounding system according to aspects of the present disclosure, to leach from the tube chamber 806 and into a column chamber at least partially-defined by an electrically conductive column such as any of the electrically conductive columns discussed above with regard to FIGS. 3-6. Suitably-colored indicia such as a vertical line 816 can be printed on the exterior surface 800a of the salt replenishment tube 800 so that an installer can readily ensure that when he/she attaches the salt replenishment tube to the ground rod 802, the weep holes 808 will point away from the ground rod 802, and thus that the ground rod 802 will not block the weep holes 808. The electrolytic salt 814 can be a product that is commercially available from Electronics Research, Inc., based in Chandler, Ind., United States. The electrolytic salt 814 that leaches into a column chamber during use enhances and helps maintain electrolytic properties of electrolytic fill added to a column chamber in manner to be described herein. To fully contain the electrolytic salt 814 within the salt replenishment tube 800 prior to installation at a grounding site, pieces of water-soluble tape 818 can be a placed into position over each weep hole 808 and fastened in place to the salt replenishment tube 800. The water-soluble tape can be a commercially-available product sold by, for example, SmartSolve as No. IT112021S Dissolving Tape. The pieces of tape 818 shown in FIG. 8 are shown merely as representative sizes, and any suitable sizes of such pieces can be used. Finally shown in FIG. 8 is a ground rod clamp 820, which can take the form of the acorn clamp illustrated. Acorn clamp (ground member clamp) 820 is shown attached to the ground rod 802 proximate an upper end 822 of the ground rod 802. The function of acorn clamp 820 is more readily explained with reference to FIG. 9, below.

FIG. 9 is a detail of lead connections at an upper end of a grounding system electrode according to various aspects of the present disclosure. As an example, FIG. 9 depicts an upper portion of the single continuous electrically conductive column 512 of electrode 510 (FIG. 5C), proximate its upper end 516. Column 512 is shown encircling the joined electrolytic salt tube 800 and ground rod 802, a position taken when electrode 510 is installed into a hole formed into native soil at a grounding site, following the driving of the ground rod 802 into native soil at a bottom of the hole and the ensuing binding of an upper portion of the ground rod 802 and the salt replenishment tube together with the fasteners 804, the installation steps discussed in detail with regard to FIGS. 14A-14C. FIG. 9 shows a bus bar 900 constructed of electrically conductive material, such as copper, comprising a first bus bar connector (lay-in lug) 902, a second bus bar connector (lay-in lug) 904, and a third bus bar connector (lay-in lug) 906, and a base 908 electrically interconnecting each of the bus bar connectors 902,904,906 to one another. A first lead 910 (which can have, for example, a one-foot length) brings the first bus bar connector 902 into electrical communication with the electrically conductive column 512 through insertion of one end of the first lead 910 into column lug 84, and connection of its opposite end to the first bus bar connector 902. A second lead 912 (which can have, for example, a two-foot length) brings the second bus bar connector 904 into electrical communication with the electrically conductive column 512 by being threaded through the second bus bar connector 904, with one end of the second lead 912 inserted into column lug 86, and the opposite end of the second lead 912 inserted into column lug 88. The third bus bar connector 906 and the acorn clamp 820 are configured to be brought into electrical communication with the fault current source 11 (FIG. 1). A fault current supply cable 914 can be supplied by an installer and can be cut to a custom length from a stock supply of such cable owned by the installer, the length sufficient to connect at one end to the inter-system bonding termination block (IBTB) 55 (FIG. 1), for its opposed end to be threaded through the acorn clamp 820 and third bus bar connector 906 as shown in FIG. 9, and to then exit the electrical grounding system for possible connection to another electrical grounding system installed in a grounding network according to an aspect of the present disclosure. Thus, fault current supply cable 914 originating from IBTB 55 is shown to be threaded to one side of acorn clamp 820, form a loop at 916 before being threaded to another side of the acorn clamp 820, and then threaded through the third bus bar connector 906 before proceeding outwardly to another electrical grounding system. In other implementations, where only a single electrical grounding system is needed, such as for many residential structures, the opposed end of fault current supply cable 914 is not threaded through the third bus bar connector 906 to connect to another item; instead, for such implementations, that opposed end can simply terminate at the third bus bar connector 906.

Figure 10:
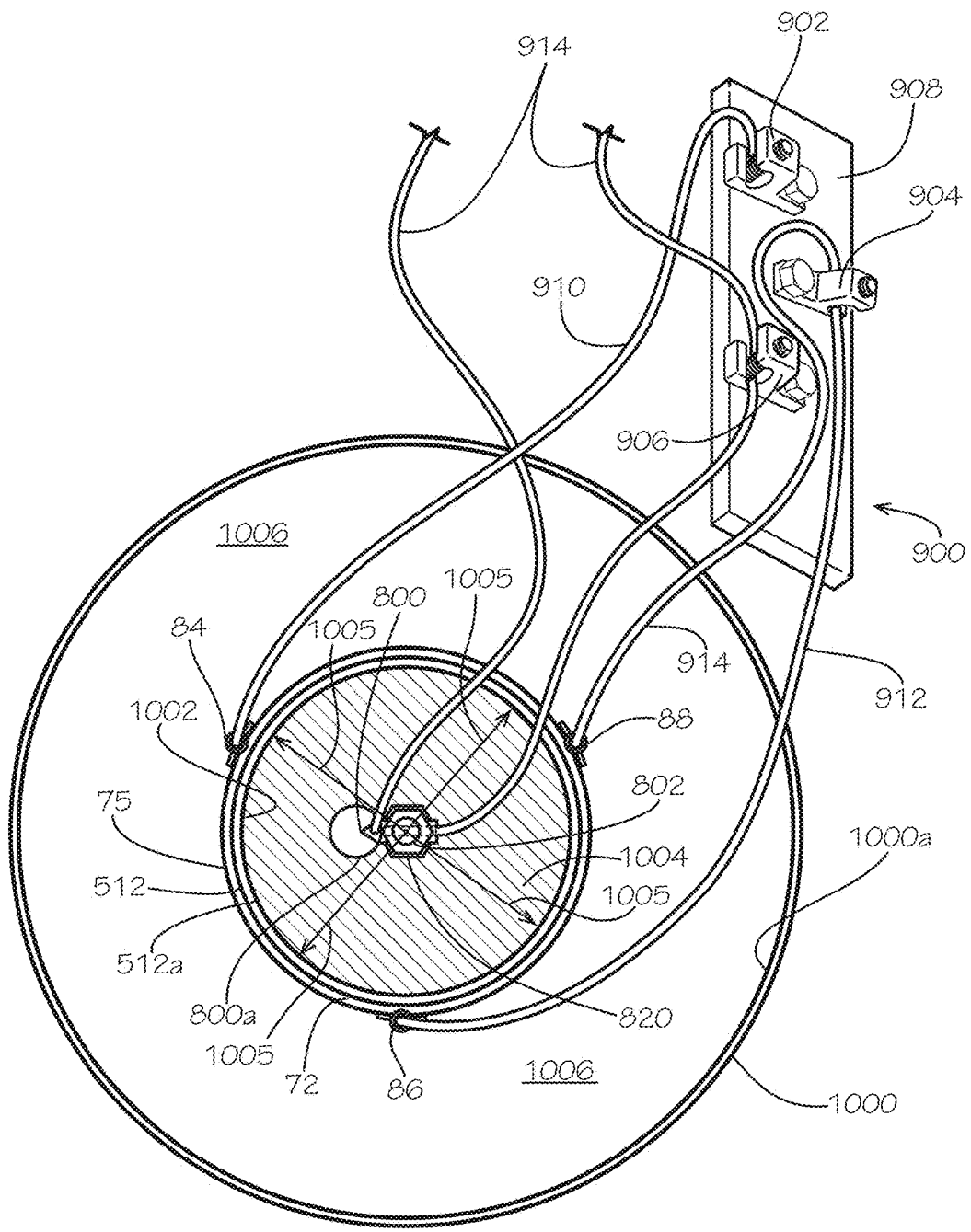
FIG. 10 is a top view of an installed electrical grounding system, prior to placement of an enclosure atop the system, with a bus bar and associated wiring connections of FIG. 9 shown in perspective.

FIG. 10 is a top view of an installed electrical grounding system, prior to placement of an enclosure atop the system, with the bus bar 900 and associated wiring connections of FIG. 9 shown in perspective. The installation shown in FIG. 10, which employs an installation sleeve 1000 having an inner surface 1000a, is discussed in detail with reference to FIGS. 14A and 14B, and the construction of the installation sleeve 1000 is discussed in detail with reference to FIG. 13A. A column chamber 1002 is defined between an interior surface 512a of the electrically conductive column 512, the exterior surface 800a of the salt replenishment tube 800, and an exterior surface 802a (FIG. 9) of the ground rod 802. Electrolytic fill 1004 is disposed within the column chamber 1002. The electrolytic fill 1004 can be comprised of a mixture configured to conduct, in a radially outward direction exemplified by direction arrows 1005, at least a portion of any fault current received by the ground rod 802 in an electrical grounding system constructed and installed according to various aspects of the present disclosure. The radially outward direction exemplified by the direction arrows 1005 extends from the ground rod 802, through the column chamber 1002, and to the carbon fiber fabric 72. The electrolytic fill 1004 can comprise hydrophilic clay and electrolytic salts. In the current aspect of the present disclosure, the electrolytic fill 1004 comprises a composition of bentonite clay, copper sulfate, gypsum, and magnesium sulfate, with bentonite clay comprising at least 50% of the composition. Such a composition is commercially available in dry form from Electronics Research, Inc., based in Chandler, Ind., United States, and expected to be sold under the trademark ELF™. When a sufficient quantity of water is added, the electrolytic fill 1004 can be a colloid mixture and applied to various implementations of the grounding system of the present disclosure as a paste. FIG. 10 shows an upper surface 1004a of the electrolytic fill 1004 exposed within the column chamber 1002, prior to application of bentonite clay atop upper surface 1004a, as will be described with reference to FIGS. 14A and 14B. The outer face 75 of the carbon fiber fabric 72 and the inner surface 1000a of the installation sleeve 1000 define an outer annular space 1006. Electrolytic backfill material can be added to this outer annular space 1006, in a manner to be described with regard to FIG. 14B.

Figure 11:
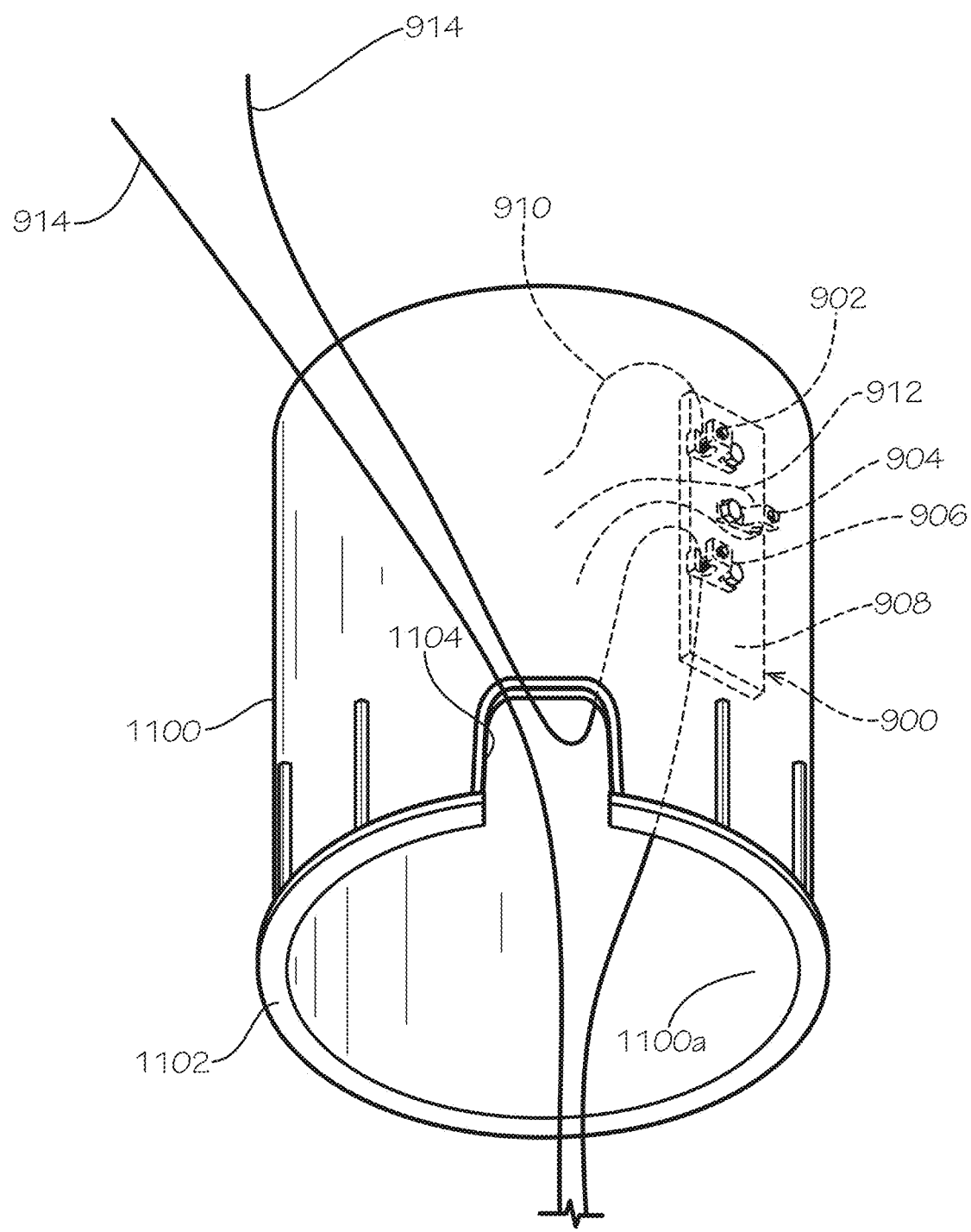
FIG. 11 is a perspective view of an enclosure for an electrical grounding system according to various aspects of the present disclosure, also depicting the bus bar of FIG. 10 attached to an inner surface of the enclosure.

FIG. 11 is a perspective view of an enclosure 1100 for an electrical grounding system according to various aspects of the present disclosure, also depicting the bus bar 900 attached to an inner surface of the enclosure 1100. The enclosure 1100 is positioned over an electrically conductive column (such as column 512 in FIG. 10) as the final installation step to protect the column 512 and its contents. The enclosure 1100 has a lower rim 1102 defining an opening 1104 extending axially upwardly, the opening 1104 providing a passage through which the fault current supply cable 914 can be routed to the acorn clamp 820 (FIG. 10), through the third bus bar connector 906 of the bus bar 900, and back out of the enclosure 1100 to another electrical grounding system. Enclosure 1100 can take the form of a valve box constructed of plastic, commonly used for irrigation systems, and in other implementations it can assume any other shape suitable for purposes to be accomplished by a grounding system installed according to various aspects of the present disclosure. Further, the top of the enclosure (not shown) can form a cover that is removably attached to the remainder of the enclosure 1100 to provide for convenient post-installation access to components of a buried electrical grounding system constructed according to various aspects of the present disclosure. The bus bar 900 can be attached to an inner surface 1100a of the enclosure 1100 by any suitable means, such as by an adhesive that can be applied to a lower surface 908a (FIG. 12B) of the bus bar base 908. The adhesive can have a composition allowing paper backing to be removably applied to an adhesive layer on lower surface 908a, so that the paper backing shields the adhesive layer during shipment of the kit discussed with regard to FIG. 15 but can be removed when an installer is ready to attach the bus bar 900 to the inner surface 1100a of the enclosure 1100.

Figure 12A:
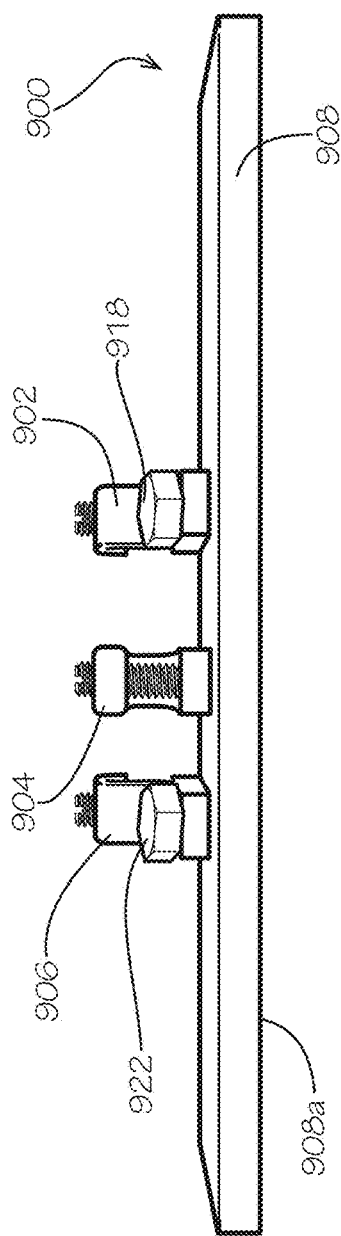
FIGS. 12A and 12B are side and top perspective views, respectively, of the bus bar illustrated in FIGS. 10 and 11.
Figure 12B:
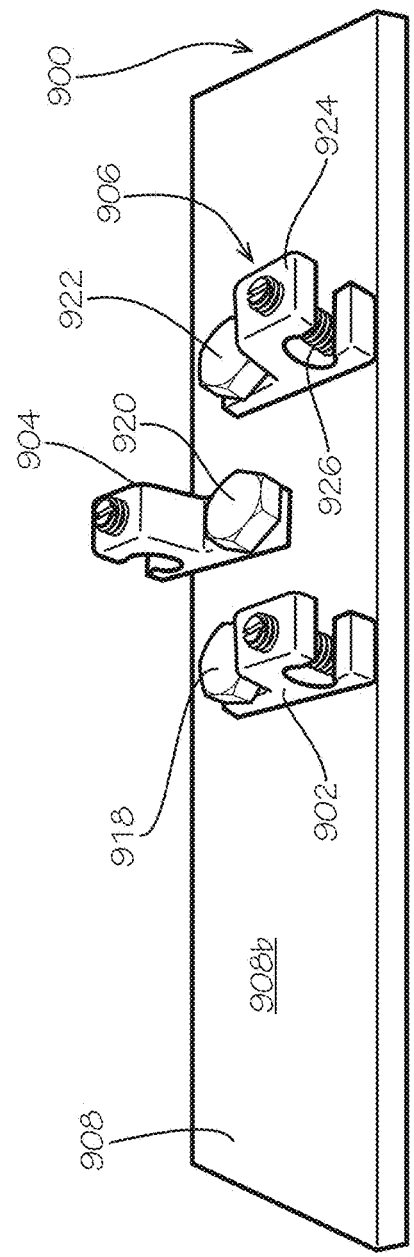

FIGS. 12A and 12B provide more detailed views of the bus bar connectors 902,904,906 of bus bar 900, all of which can be mounted to an upper surface 908b of the bus bar base 908 with respective bolts 918,920,922. As mentioned previously, each of the bus bar connectors 902,904,906 can be constructed as a copper lay-in lug commercially available from suppliers such as elecDirect.com, SKU #CL50DB. Referring to third bus bar connector 906 in FIG. 12B as a representative example, each such lay-in lug includes a C-shaped, one-piece bearing 924 having an internally-threaded aperture (not shown) that receives an externally-threaded screw 926 extending substantially vertically through an upper branch of the bearing 924. A lead (wire/cable) can be passed beneath a lower end of the screw 926 and once the lead is in the desired position, the screw 926 can be tightened such that the lead is secured between the lower end of the screw 926 and a lower branch of the bearing 924.

Figures 13A, 13B:
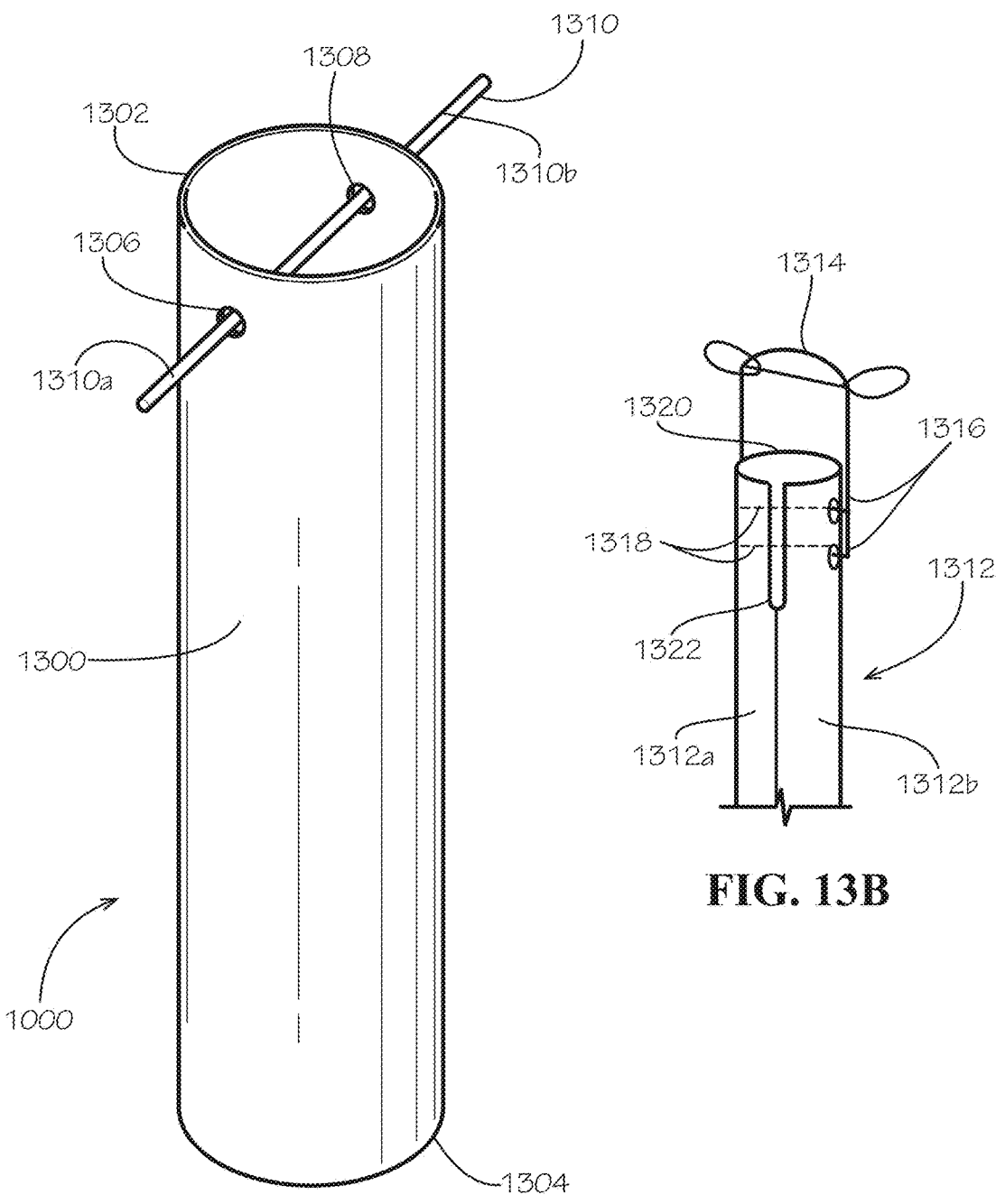
FIGS. 13A and 13B are perspective views of installation sleeves constructed according to different aspects of the present disclosure.

FIG. 13A provides a perspective view of the installation sleeve 1000 discussed with regard to FIG. 10. The installation sleeve 1000 is employed to facilitate installation of a grounding system according to aspects of the present disclosure, and is removed upon completion of an installation, as will be discussed in detail with regard to FIGS. 14A and 14B. In an implementation of the present disclosure, the installation sleeve 1000 can be supplied by an installer of the system, rather than being included within a kit such as that discussed with regard to FIG. 15. The installation sleeve 1000 can be constructed of any material sufficiently durable to withstand pulling forces without breakage, such as PVC of a suitable thickness, and can have a length of at least 180 cm (72 in.). As shown in FIG. 13A, the installation sleeve 1000 can be formed as a tube having a sleeve wall 1300 extending between an upper end 1302 and a lower end 1304, the sleeve wall 1300 defining diametrically-opposed apertures 1306, 1308. A lifting rod 1310 can extend through the apertures 1306, 1308 such that it can be grasped by an installer at portions 1310a,b to facilitate application of upward pulling force to the installation sleeve 1000 when it is desired to remove the installation sleeve 1000 in the manner to be discussed with regard to FIGS. 14A and 14B.

Figure 16:
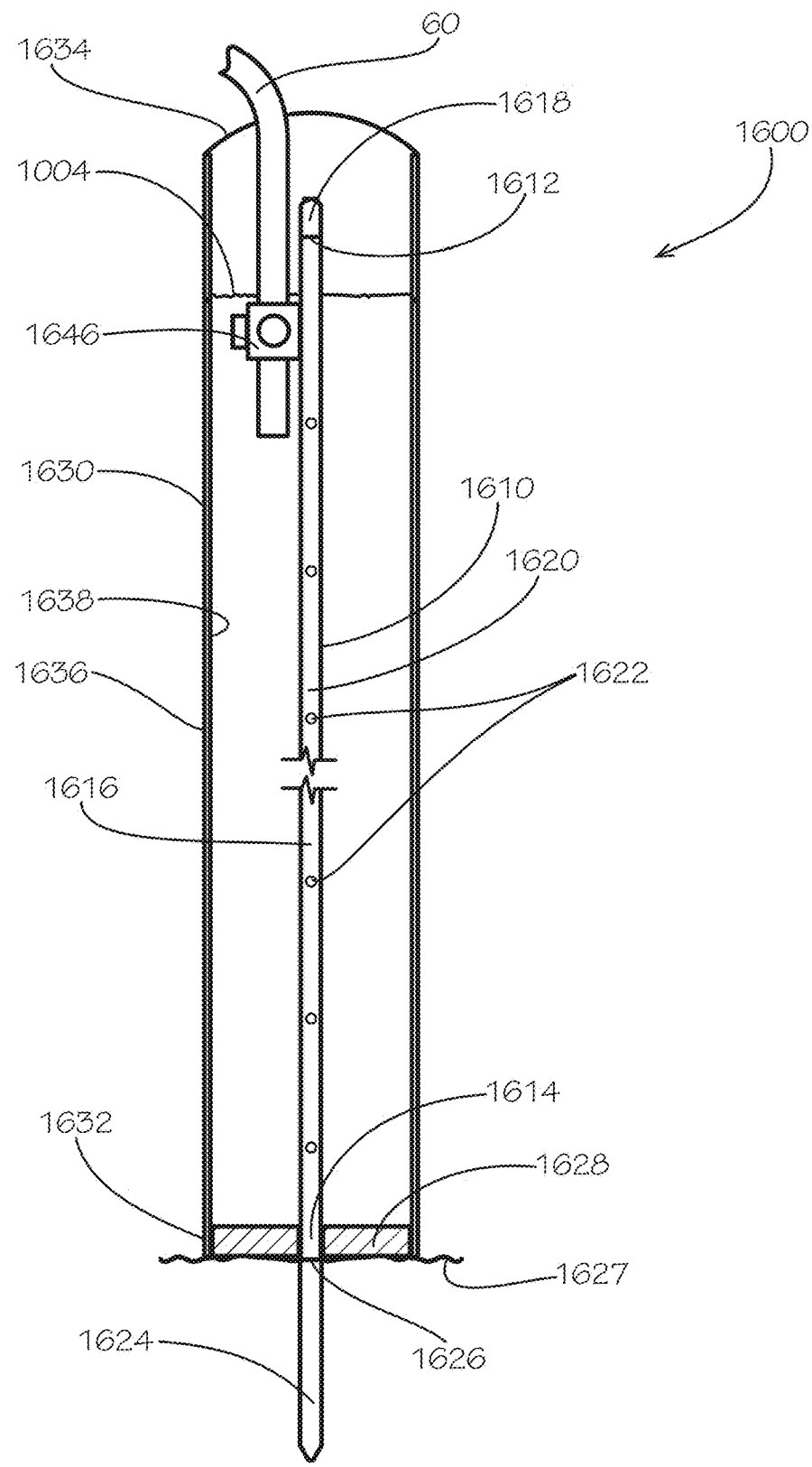
FIG. 16 is a sectional view illustrating an electrical grounding electrode according to another aspect of the present disclosure.

FIG. 13B illustrates a different type of installation sleeve 1312 that, unlike installation sleeve 1000 of FIG. 13A, is made of conductive material and is intended to be left in an installation site for the serviceable life of an electrical grounding system constructed according to a different aspect of the present disclosure, such as that to be discussed with regard to FIG. 16, wherein the installation sleeve 1312 could substitute for the electrically conductive column 1630 disclosed therein. The installation sleeve 1312 can be split into two sleeve halves 1312a, 1312b for the entire length of the installation sleeve 1312 to facilitate removal of the sleeve 1312 from an installation hole. Such removal is further facilitated by a bail 1314, which can be a U-shaped member with legs attached to the sleeve halves 1312a,b at apertures 1316. Fasteners 1318 can extend from one leg of the bail 1314, through the apertures 1316 in the installation sleeve 1312, and to the other leg of the bail 1314. In this manner, the fasteners 1318 hold the sleeve halves 1312a,b together proximate an upper end 1320 of the installation sleeve 1312. The installation sleeve 1312 can define at least one longitudinal slot 1322 extending downwardly from the upper end 1320 of the installation sleeve 1312. The longitudinal slot 1322 can admit a stranded wire extension (such as stranded wire extensions 60, 61 in FIG. 1) through the installation sleeve 1312 before being anchored to a bonding lug of a hollow electrode (such as bonding lug 1646 of hollow electrode 1612 in FIG. 16).

Figure 14A:
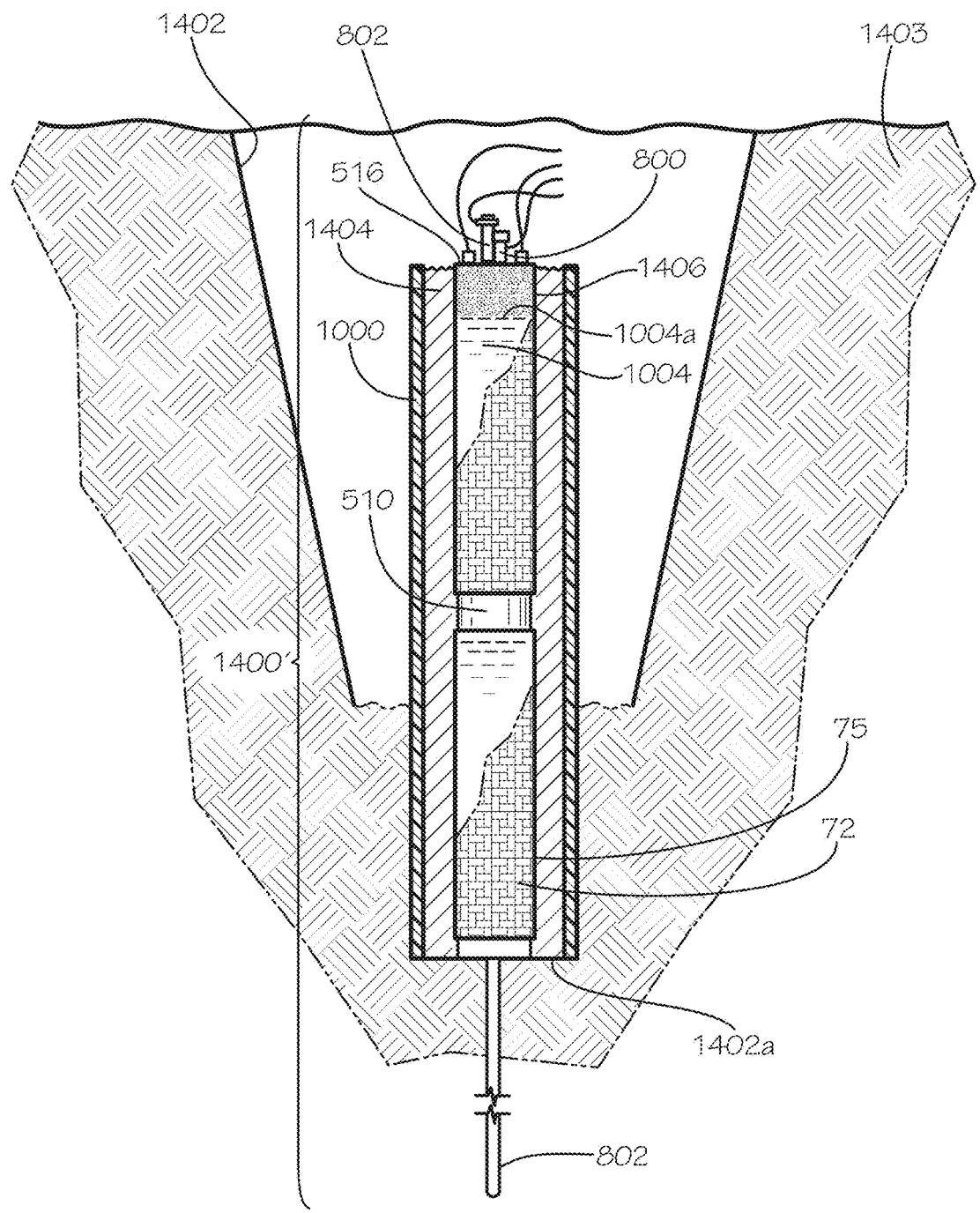
FIG. 14A is a sectional view of an installed electrical grounding system according to an aspect of the present disclosure inserted within a hole formed in native soil at a grounding site, prior to placement of an enclosure atop the system, and depicting use of an installation sleeve for one type of native soil.
Figure 14B:
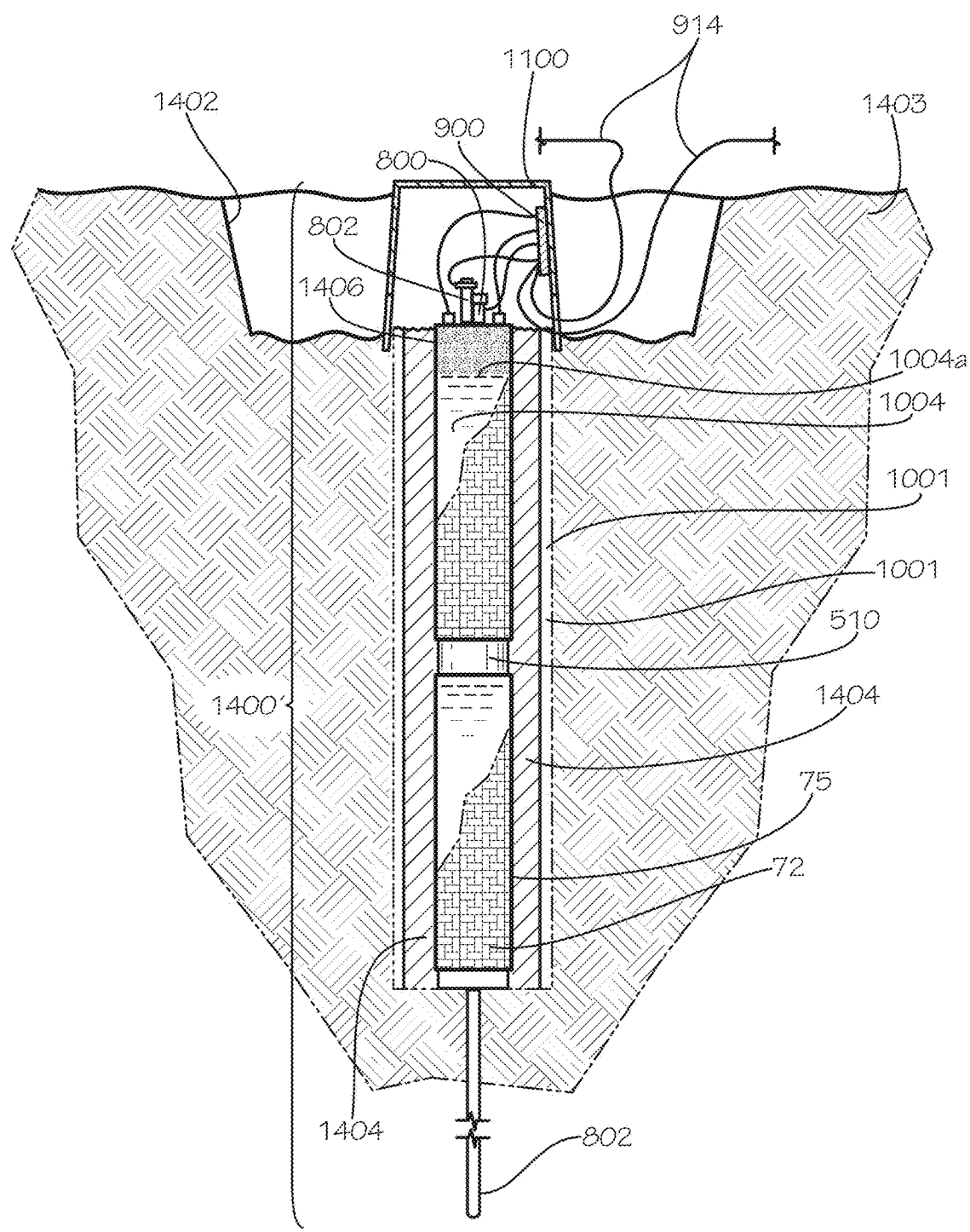
FIG. 14B is a sectional view of the installed electrical grounding system depicted in FIG. 14A, but showing the system fully installed, with placement of an enclosure atop the system following complete removal of the installation sleeve.

FIGS. 14A and 14B illustrate installation stages of an electrical grounding system 1400 according to various aspects of the present disclosure, where particular types of native soils require the use of an installation sleeve such as that discussed above with regard to FIG. 13A, namely, native soils such as dry sand that do not allow a hole wall to remain completely stable. In other words, such soil has a tendency to slide back into a hole originally formed. FIG. 14A shows an electrical grounding system 1400 partially installed in a hole 1402 formed into native soil 1403. In the first installation step, some of the native soil 1403 can be excavated, such as with a manual or automated auger and hydraulic digging equipment, to try to form the hole 1402. For various implementations, minimum hole size can be 140 cm (54 in.) deep and 20 cm (8 in.) in diameter. A ground member (such as ground rod 802) can then be driven into the native soil 1403, substantially centered at the bottom 1402a of the hole 1402 and, in various implementations, at a depth of at least 1.25 meters (~48 in.) into that native soil 1403, such that the top of the ground rod 802 would then be about 10-15 cm (4-6 in.) below surrounding grade. Next, a salt replenishment tube (SRT) 800, constructed as described with regard to FIG. 8, can be fastened to the undriven portion of the ground rod 802 in the manner also described with regard to FIG. 8. In various implementations, the top of the SRT 800 can be about 5 cm (2 in.) below the top of the ground rod 802. An installation sleeve 1000, constructed as described with regard to FIG. 13A, can then be positioned in the hole 1402 circumferentially around the fastened combination of the ground rod 802 and the SRT 800. A hollow electrode (such as electrode 510 in FIG. 5C), can then also be inserted into the hole 1402 and positioned circumferentially around the same fastened combination, such that electrode 510 can be thereby positioned, and temporarily contained within, the installation sleeve 1000, as seen in FIG. 14A. In some implementations, the top of the electrode 510 can be positioned about six inches below finish grade.

Next, and still referring to FIG. 14A, electrolytic backfill material 1404 can be added to the outer annular space (identified at 1006 in FIG. 10) defined between the outer face 75 of the carbon fiber fabric 72 and the inner surface 1000a of the installation sleeve 1000. In various implementations, electrolytic backfill material 1404 can be applied to the outer annular space 1006 in a semi-liquid form. The electrolytic backfill material 1404 can be a material comprised of ingredients that promote migration of electrons into the native soil 1403 and that create a hydrophilic column around the electrode 510. The electrolytic backfill material 1404 can also be sold as part of a kit, as discussed in more detail with regard to FIG. 15. For ease of applying this material, an installer can opt to place a temporary cover over the entire electrode 510, thus preventing the electrolytic backfill material 1404 from spilling into the electrode 510. For purposes of illustration, an 8-inch bore hole can require up to roughly 1.2 cubic feet of electrolytic backfill material

1404. The installer can fill the outer annular space 1006 with the electrolytic backfill material 1404 up to the top of the electrode 510. Once that filling is completed, any temporary cover placed over the electrode 510 is removed, and electrolytic fill 1004 is added to the column chamber 1002 (FIG. 10), such that the electrolytic fill upper surface 1004*a* (FIG. 10) is at an elevation lower than the upper end 516 of the electrically conductive column 512 of electrode 510. A layer of bentonite clay 1406 can then be added within the column chamber 1002 atop the electrolytic fill upper surface 1004*a*. The layer of bentonite clay 1406 forms a hydrophilic layer proximate the upper end 516 to help preserve moisture content of the electrolytic fill 1004 within the column chamber 1002, which is particularly beneficial in arid environments. The bentonite clay 1406 can be added as granules in some implementations but can take other suitable forms. Also, the bentonite clay 1406 need not be applied immediately after the addition of the electrolytic fill 1004, but can be added as a penultimate step, preceding the final step of adding the enclosure 1100 shown in FIG. 14B.

Following the addition of the electrolytic fill 1004 or, in other implementations, the addition of the bentonite clay, the installation sleeve 1000 is gradually removed in conjunction with incremental backfilling steps. More particularly, the installation sleeve is moved upwardly, by an increment less than a length of the installation sleeve 1000, to expose a portion of the electrolytic backfill material 1404 to surrounding native soil 1403. Following such incremental movement, a portion of the native soil 1403 previously excavated from the hole 1402 is returned to the hole 1402 as an outer backfill, such that returned soil is placed in a void defined between the installation sleeve 1000 and non-disturbed native soil 1403 defining the hole 1402 (i.e., between the sleeve wall 1300 and the hole wall 1405). Optionally, the returned soil can be mixed with additional electrolytic backfill material 1404. The steps of moving the installation sleeve 1000 upwardly by an increment, and returning to the hole 1402 a portion of soil excavated from the hole 1402, are sequentially repeated until the installation sleeve 1000 is fully removed from the hole 1402.

FIG. 14B illustrates the electrical grounding system 1400 in its fully installed state. With the installation sleeve 1000 (FIG. 14A) completely removed, the electrolytic backfill material 1404 is directly exposed to the surrounding backfill comprising the native soil 1403 returned to the hole 1402. A gap 1001 is shown in FIG. 14B merely for illustrative purposes to show the space that had been occupied by installation sleeve 1000 in FIG. 14A, but it shall be understood that in the fully installed state shown, the electrolytic backfill material 1404 and the backfill comprising the native soil 1403 come in contact with one another. Either after the above-described removal of the installation sleeve 1000 from the hole 1402, or after the earlier step of positioning the electrode 510 within the installation sleeve 1000, the ground rod 802 and the electrode 510 are electrically interconnected, and the electrical grounding system 1400 is connected to a fault current source 11 (FIG. 1), in the manner described above with regard to FIG. 9. FIG. 14B also illustrates placement of the enclosure 1100 atop the electrode 510.

Figure 14C:
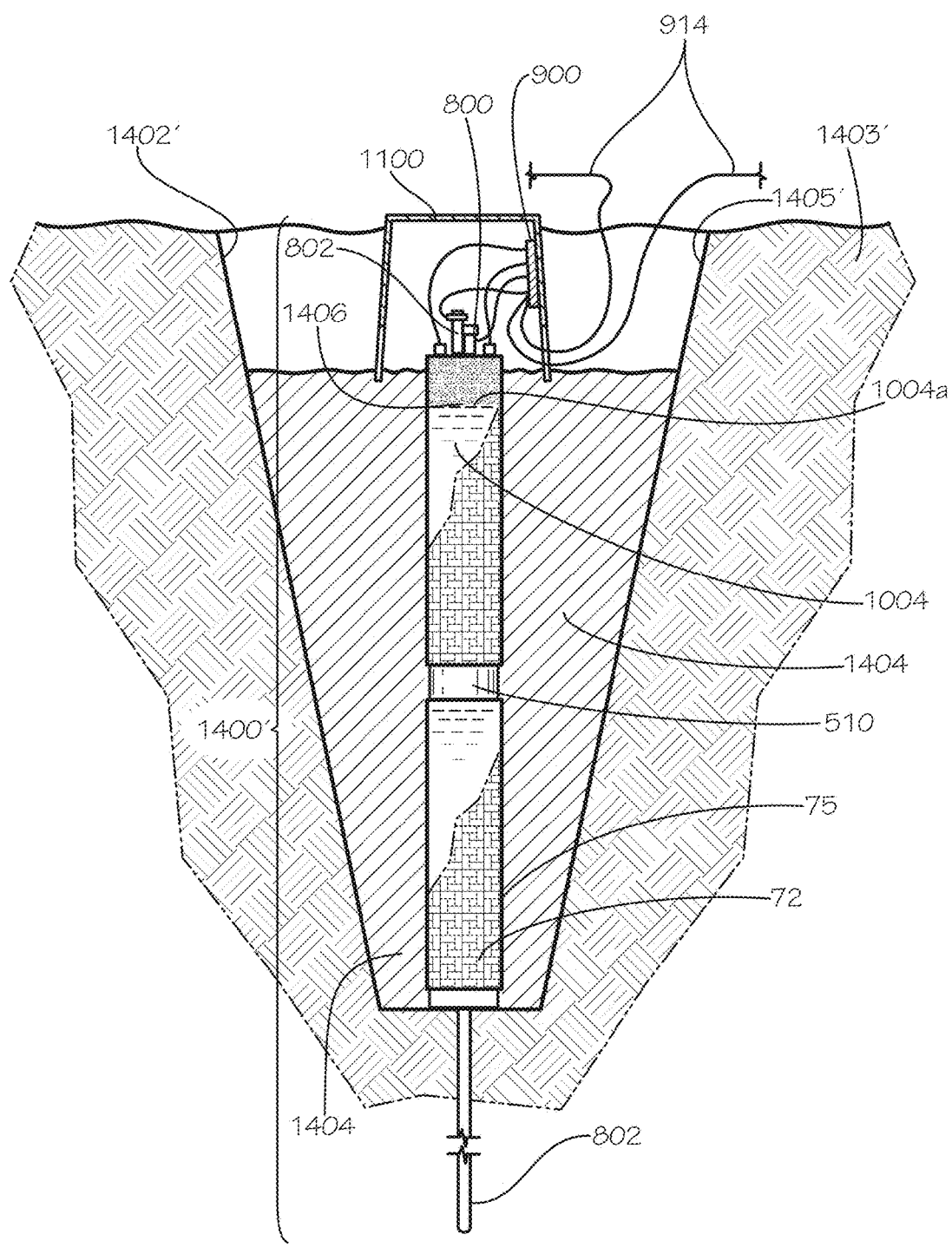
FIG. 14C is a sectional view of a fully-installed installed electrical grounding system according to an aspect of the present disclosure, but showing a different type of native soil for which an installation sleeve was not used.

FIG. 14C is a sectional view of a fully-installed installed electrical grounding system 1400' according to an aspect of the present disclosure, with primed numerals in FIG. 14C indicating elements corresponding, but not identical, to those previously identified by unprimed reference number counterparts). FIG. 14C shows a different type of native soil 1403' for which an installation sleeve was not used, due to stability of the hole wall 1405' provided by this different type of native soil 1403'. The steps resulting in the installation of electrical grounding system 1400' are the same as those described above with regard to FIGS. 14A and 14B, with three exceptions in the current aspect. First, the as indicated above, the installation of FIG. 14C does not involve placement of an installation sleeve into hole 1402'. Second, following placement of the electrode 510 within the hole 1402' (but not necessarily immediately following that placement), the electrolytic fill material 1404 is added to the annular space, not between the hole wall 1405' and any installation sleeve, but instead between the hole wall 1405' and the outer face 75 of the carbon fiber fabric 72 of the electrode 510. Finally, since FIG. 14C shows the electrolytic fill material 1404 serving as the sole backfill material external to the electrode 510, the installation of FIG. 14C omits the steps of returning native soil to the hole to serve as such external backfill.

Figure 15:
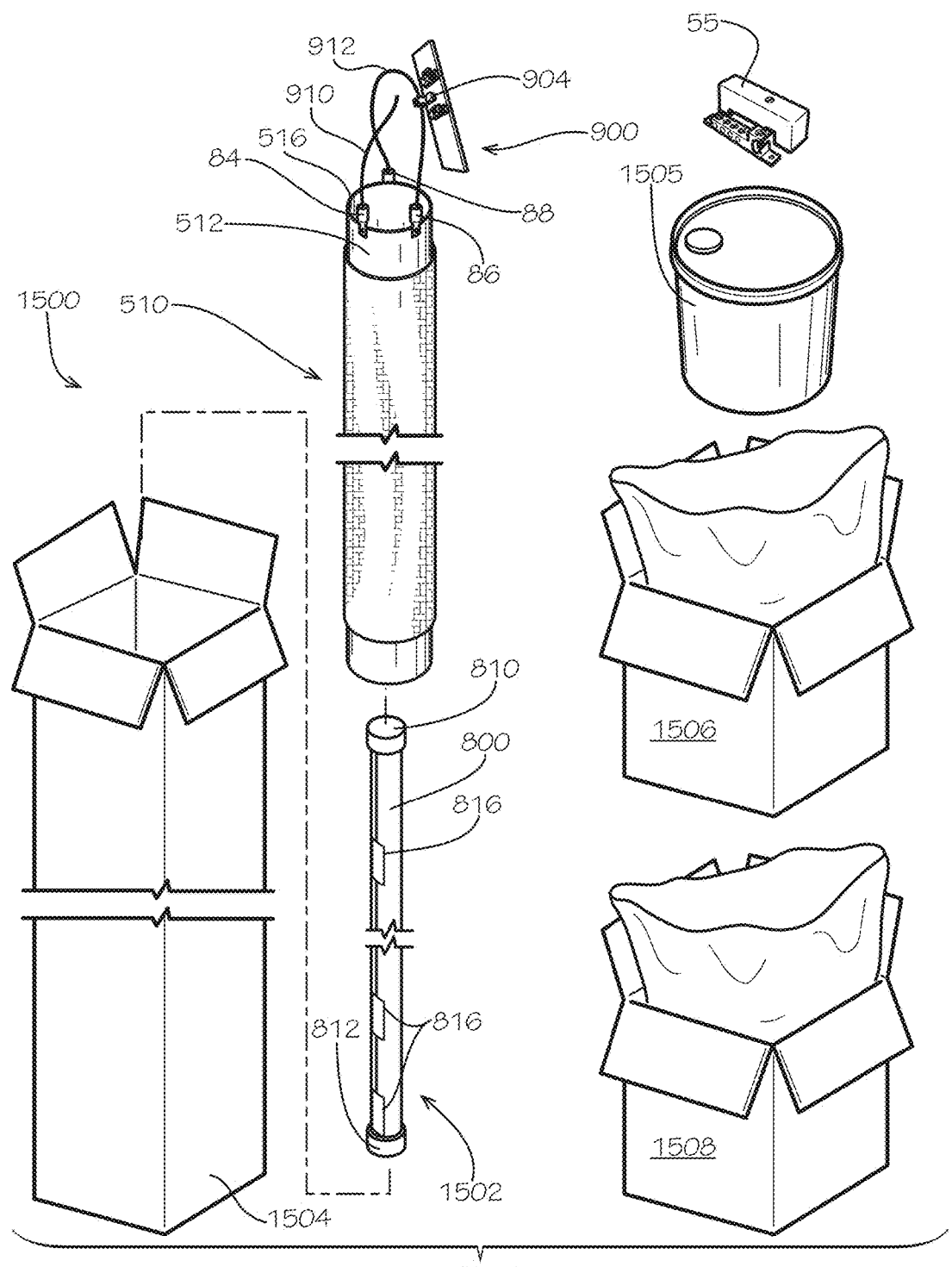
FIG. 15 is a perspective view illustrating components that can be sold together as a kit, along with certain other components illustrated in preceding figures, according to another aspect of the present disclosure.

FIG. 15 illustrates a kit 1500 comprising elements of an electrical grounding system according to an aspect of the present disclosure. Kit 1500 includes a hollow electrode, such as electrode 510 (FIGS. 5C and 14A-140), and a bus bar 900, constructed as described above with regard to FIGS. 9, 12A, and 12B. As already described with regard to FIG. 3, electrode 510 can comprise a first column lug 84, a second column lug 86, and a third column lug 88 attached to, and in electrical communication, with the electrically conductive tube (column) 512 of the electrode 510, proximate upper end 516 of the electrically conductive column 512. Electrode 510 and bus bar 900 can be connected to one another in such a manner as to prevent excessive movement of the bus bar 900 during shipment of the kit 1500. In an implementation of the present disclosure, a first lead 910 can be attached at one end to the first column lug 84, and a second lead 912 can be threaded through one of the bus bar connectors, such as connector 904, one end of the second lead 912 connected to the second column lug 86, and another end of the second lead 912 connected to the third column lug 88. Kit 1500 can further include a salt replenishment tube (SRT) assembly 1502 positioned inside the electrode 510 during shipment of the kit 1500, the salt replenishment tube assembly 1502 comprising an SRT 800 containing electrolytic salt 814 (FIG. 8), caps 810, 812 received the ends of the SRT 800 to retain the electrolytic salt 814 within the SRT 800, and water-soluble tape 816 placed over each weep hole 808 (FIG. 8) in the SRT 800, the water-soluble tape 816 configured to prevent escape of the electrolytic salt 814 out of the SRT 800 through the weep holes 808 during shipment, all of the foregoing aspects of SRT assembly 1502 described above with regard to FIG. 8. The SRT assembly 1502 is configured such that, during use of the electrical grounding system, the water-soluble tape 816 dissolves over time to allow the electrolytic salt 814 to leach from the inner chamber of the SRT 800, through the weep holes 808, and into space external to the SRT 800. As shown in FIG. 15, the combination of the electrode 510, bus bar 900 and associated wiring, and the SRT assembly 1502 are all receivable in a shipping container 1504. Optionally, the SRT 800 can additionally be packaged in a plastic bag to further prevent against leakage of the electrolytic salt 814 to other components during shipment. In addition, kit 1500 can further comprise a bucket 1505 containing a predetermined quantity (such as five gallons) of electrolytic fill 1004 (FIG. 10); a container 1506 containing a predetermined quantity (such as two cubic feet) of electrolytic backfill material 1404; a container 1508 containing a predetermined quantity (such as two pounds) of bentonite clay granules; a ground member clamp (acorn clamp 820, FIG. 8); and an IBTB 55 (FIG. 1). The bucket 1505 can contain electrolytic fill in the form of a paste, in which dry electrolytic fill material available from the supplier is diluted with water to less than 100% (such as 80%, for example) of its installed dilution. An installer can then mix more water with the paste at the installation site to achieve a dilution suitable to add to a grounding system electrode in the manner described above with regard to FIG. 10.

FIG. 16 illustrates an electrical grounding system 1600 according to another aspect of the present disclosure. Electrical grounding system 1600 includes a hollow electrode 1610, which can be constructed of a conductive material such as a 1-inch diameter copper tube, though other types of conductive materials can be used. Hollow electrode 1610 can define an upper end 1612, a lower end 1614, and an electrode wall 1616 extending between the upper end 1612 and the lower end 1614. A cap 1618 can be received on the upper end 1612. The electrode wall 1616 can define an inner chamber (not shown) within the hollow electrode 1610 and can define an exterior surface 1620. The electrode wall 1616 can also define a plurality of weep holes 1622 that can extend from the exterior surface 1620 through the electrode wall 1616 to the inner chamber. A ground member 1624 can be operatively connected to the lower end 1614 of the hollow electrode 1610 at a junction 1626 and can extend downwardly from the junction 1626 into native soil 1627. FIG. 16 is not necessarily drawn to scale, and the ground member 1624 can extend into the native soil 1627 at a greater relative depth than that shown. The ground member 1624 can be constructed of a conductive material, such as a copper-clad, ¾-inch diameter rod, though other types of conductive materials can be used with different or the same diameters. A base 1628, which can also be constructed of a conductive material, can surround the exterior surface 1620 of the electrode wall 1616 proximate the junction 1626. The base 1628 can be shaped as a disc with a central aperture or can be provided with a pair of base bushings (such as those to be described herein with reference to FIGS. 17 and 18), one of which can allow the ground member 1624 to be removably attached to the base 1628 (such as in the manner to be described with reference to FIGS. 17 and 18). Thus, in various aspects, the hollow electrode 1610 can be directly connected to the ground member 1624, or the hollow electrode 1610 can be interconnected to the ground member 1624 via the base 1628; the terms "operatively connected" and "junction" can encompass both possible forms of connection, as well as other connection mechanisms known in the art, such as welding, adhesives, press-fits, fasteners, or being formed as a monolithic construction.

Still referring to FIG. 16, an electrically conductive column 1630 can surround the hollow electrode 1610. The electrically conductive column 1630 can be constructed of a conductive material, such as copper, and can have an annular, or tube-like, cross-section, though other cross-sectional shapes are contemplated as being within the scope of the present disclosure. The electrically conductive column 1630 can define a lower end 1632, an upper end 1634, and a column wall 1636 extending between the lower end 1632 and the upper end 1634. The lower end 1632 can contact the base 1628, or can simply surround the base 1628 annularly when positioned surrounding the hollow electrode 1610. The electrically conductive column 1630 can define an outer chamber 1638 between the exterior surface 1620 of the electrode wall 1616 and the column wall 1636. Electrolytic fill 1004 can be deposited within the outer chamber 1638. The electrolytic properties of the electrolytic fill 1004 can be enhanced by removing the cap 1618, adding electrolytic salt into the inner chamber of the hollow electrode 1610, and replacing the cap 1618. The electrolytic salt can pass from the inner chamber, through the weep holes 1622, and into the electrolytic fill 1004 present in the outer chamber 1638. Since the electrolytic fill 1004 is a colloid, water molecules remain available to interact with the electrolytic salt, yet the water molecules are not as susceptible to freezing in frigid environments.

Again referring to FIG. 16, a bonding lug 1646 can be attached to the exterior surface 1620 of the electrode wall 1616, such as by welding. Attaching a ground wire, or an extension thereof such as extension 60 in FIG. 1, to the bonding lug 1646, provides an electrical communication between fault current source 11 (FIG. 1) and the electrical grounding system 1600. One portion of this electrical current can then be routed axially through the hollow electrode 1610 and axially through the ground member 1624. Another portion of the current transmitted by the bonding lug 1646 can be routed radially through the electrolytic fill 1004 and through the column wall 1636. Once the electrical grounding system 1600 is buried in a hole formed in the soil, and the hole backfilled with backfill material (in a manner such as that discussed below with regard to FIG. 20), the radially-directed current from the column wall 1636 can enter the backfill material, and flow into portions of the soil contacting the backfill material. Also, once the grounding system 1600 is installed in the manner described, the ground member 1624 can disperse the axially-directed portion of the current to the soil beneath base 1628. Additionally, the base 1628 itself is capable of routing the current it receives both axially (downwardly) into the soil beneath the base, and radially through the column wall 1636 and into the backfill material.

Figure 17:
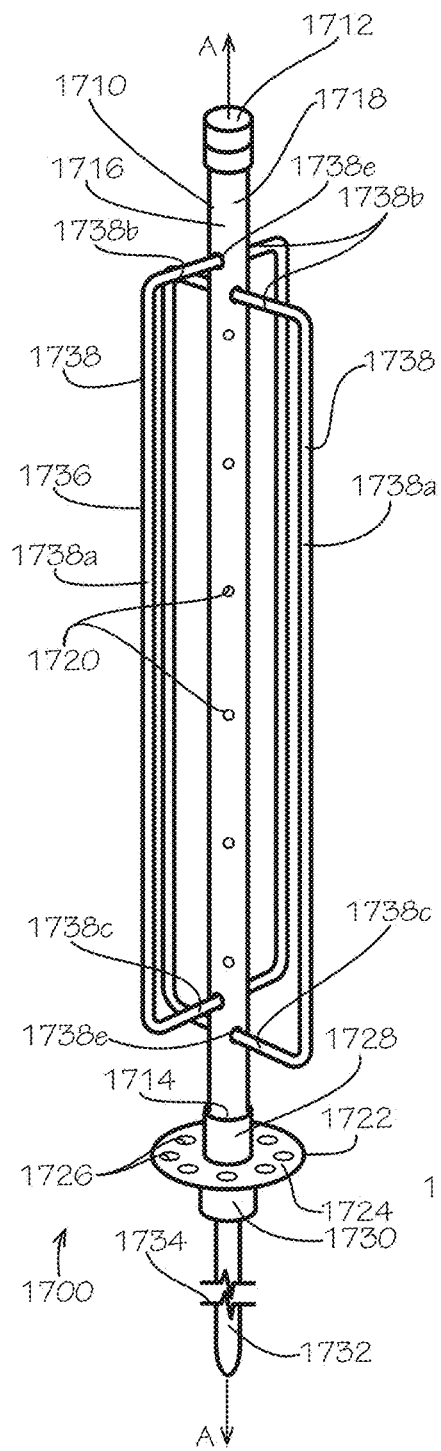
FIG. 17 is a perspective view of an electrode assembly according to another aspect of the present disclosure.

FIG. 17 is a perspective view of an electrode assembly 1700 constructed according to another aspect of the present disclosure. Electrode assembly 1700 can comprise a hollow electrode 1710, which can be constructed of a conductive material such as a 1-inch diameter copper tube, though other types of conductive materials with varying diameters can be used. Hollow electrode 1710 defines an upper end (not shown) on which is received a cap 1712, a lower end 1714, and an electrode wall 1716 extending between the upper end and the lower end 1714. The electrode wall 1716 can define an inner chamber (not shown) within the hollow electrode 1710 and can define an exterior surface 1718 and a plurality of weep holes 1720 extending from the exterior surface 1718 through the electrode wall 1716 to the inner chamber. A base 1722, which also can be constructed of conductive material, includes a plate section 1724 defining a plurality of apertures 1726 therein, the purpose of the apertures 1726 to be discussed with regard to FIG. 20. An upper base bushing 1728 can extend upwardly from the plate section 1724 and can be permanently fixed to the plate section 1724, though other types of suitable connections can be used. The upper base bushing 1728 can be constructed of a conductive material and can receive the lower end 1714 of the hollow electrode 1710, which can be permanently joined to the upper base bushing 1728, though other types of suitable connections can be used. The upper base bushing 1728 can function as a lower cap to contain electrolytic salts that can be placed within the inner chamber of the hollow electrode 1710. A lower base bushing 1730 can extend downwardly from the plate section 1724 opposite the upper base bushing 1728. The lower base bushing 1730 can be formed as an internally-threaded copper bushing permanently fixed either to the plate section 1724 or to the upper base bushing 1728, though other types of conductive materials and suitable connections can be used. A ground member 1732 can comprise an externally-threaded upper end 1734 (FIG. 18) that can be received within the internally-threaded lower base bushing 1730. It shall be understood that the term "electrode assembly" as used with regard to FIG. 17 means all components illustrated in FIG. 17 except the ground member 1732. Thus the ground member 1732 is not part of the electrode assembly 1700. The ground member 1732 can thereby be removably attached to the lower base bushing 1730 and thus to the base 1722, yet the connection provided can still meet the requirements of a "bond" under the NEC. The ground member 1732 can also be constructed of a conductive material, such as a copper-clad, ¾-inch diameter rod, though other types of conductive materials with varying diameters can be used. Break lines 1734 are used in FIG. 17 to indicate that the ground member 1732 can be available to a user in differing lengths, depending on various factors involved with the grounding site, including but not limited to soil depth.

Still referring to FIG. 17, the electrode assembly 1700 can include an electrode frame 1736 connected to the exterior surface 1718 of the electrode wall 1716. The electrode frame 1736 can comprise a plurality of substantially U-shaped frame members 1738 defining an axial section 1738a substantially parallel to the axis A-A of the hollow electrode 1710 and two spaced radial sections, namely, upper radial section 1738b and lower radial section 1738c. Each radial section 1738b,c can extend from the axial section 1738a at an angle (shown in FIG. 17 as 90°, though other suitable angles can be used) to the axial section 1738a and can terminate at respective ends 1738d, 1738e contacting, and joined to, the exterior surface 1718 of the electrode wall 1716. The frame members 1738 can be constructed of conductive material, such as ³⁄₁₆-inch diameter copper rods. As constructed, the electrode frame 1736 can increase the conductive surface area of the electrode assembly 1700, thus providing enhanced dissipation characteristics, and can provide structural support for an installation sleeve in an installed state, as will be discussed in detail with regard to FIG. 20.

Figure 18:
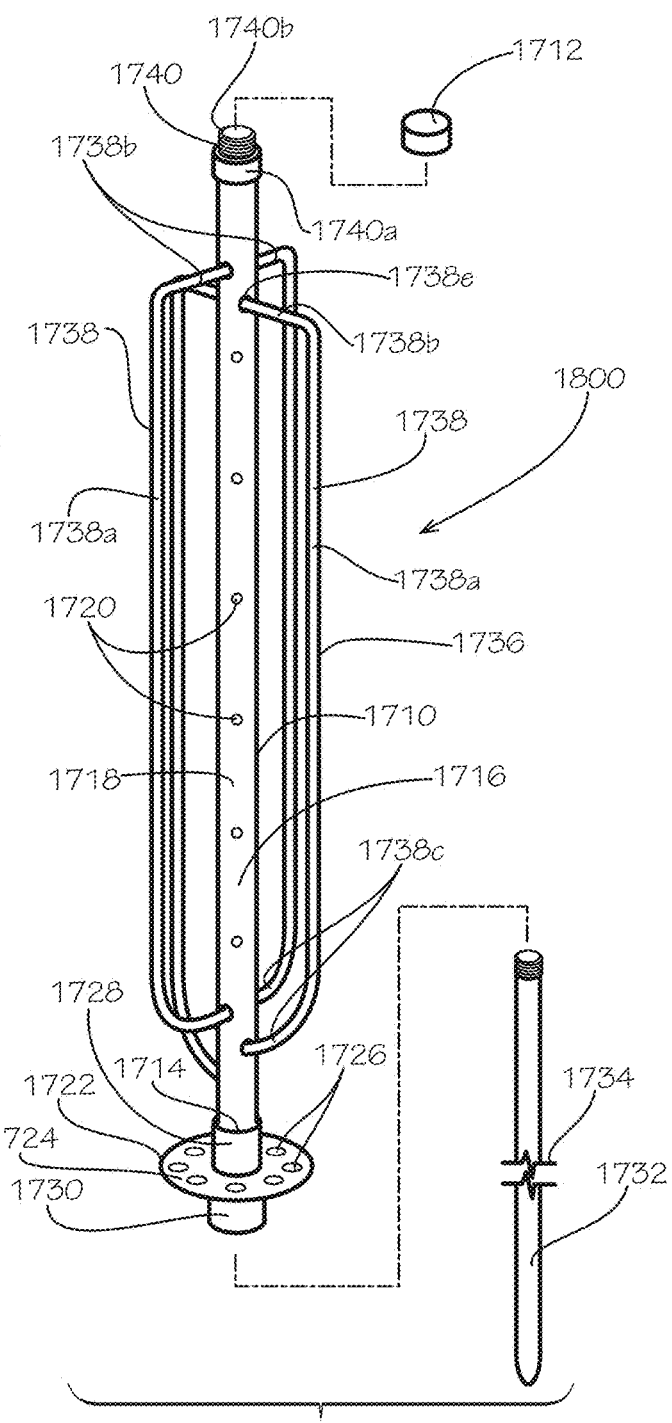
FIG. 18 is a perspective view of an electrode assembly according to yet another aspect of the present disclosure.

FIG. 18 is a perspective view of an electrode assembly 1800 constructed according to yet another aspect of the present disclosure, with certain reference numerals in FIG. 18 identifying the same components corresponding to the same numerals used in FIG. 17. However, unlike the disclosure of FIG. 17, the lower radial section 1738c of electrode assembly 1800 can have a curved profile extending from the axial section 1738a opposite the upper radial section 1738b and can terminate in a second end 1738e' contacting the exterior surface 1718 of the electrode wall 1716. Also shown in FIG. 18 is an electrode bushing 1740, which can substitute for the cap 1712'. The electrode bushing 1740 can comprise a first section 1740a and an axially opposed second section 1740b, the first section 1740a operatively connected to the upper end of the hollow electrode 1710, such as by way of permanent attachment, though other suitable attaching types can be used. The second section 1740b can be provided with male NPT (National Pipe Taper) threading, which can facilitate a removable connection to a second electrode assembly ("electrode assembly" defined as all components of an electrode assembly except the ground member) constructed identically to either electrode assembly 1700 or 1800. Specifically, second section 1740b can mate with the internal threads of a lower base bushing (such as 1730 in FIG. 17), such that two entire electrode assemblies can be joined end-to-end. Additional electrode assemblies can be joined to the resulting dual-length assembly in like manner, if needed. This provides a modular approach allowing for use of the same types of components to easily adapt to varying characteristics of different grounding sites. Alternatively, the hollow electrode 1710 of FIG. 18 can be joined directly to the base 1722 without use of a bushing.

Figure 19A:
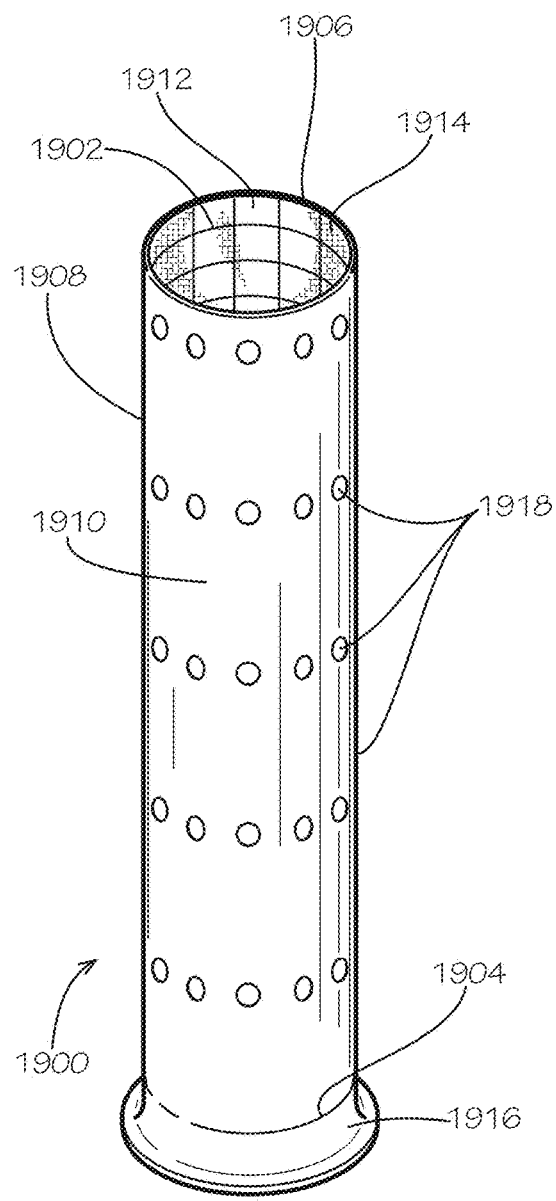
FIG. 19A is a perspective view of an installation sleeve section constructed of electrolytic material according to an aspect of the present disclosure, for use with electrical grounding assemblies of the type illustrated in FIGS. 17 and 18.
Figure 19B:
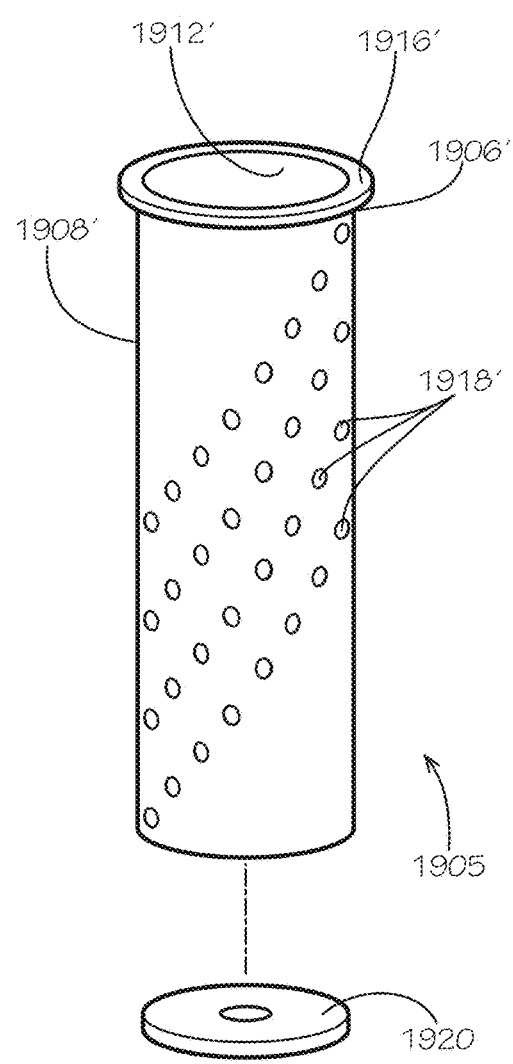
FIG. 19B is a perspective view of an installation sleeve section constructed of electrolytic material according to another aspect of the present disclosure, also for use with electrical grounding assemblies of the type illustrated in FIGS. 17 and 18.

FIGS. 19A and 19B illustrate installation sleeve sections constructed according to aspects of the present disclosure.

Referring to FIG. 19A, an installation sleeve section 1900 can be constructed of a compound that possesses electrolytic properties and that is biodegradable. A mesh 1902 can be added to this compound to enhance structural strength of the installation sleeve section 1900 and to enhance the dissipation of fault current into the installation sleeve section 1900 and, once installed, into backfill material and surrounding soils. The mesh 1902 can be constructed of ½-inch copper, though other conductive materials with varying diameters can be used. The resulting installation sleeve section 1900 is a rigid tube strong enough to withstand soil-backfill pressures. Once degradation of the biodegradable compound comprising installation sleeve section 1900 occurs in the soil of an installation site, the mesh 1902 remains to continue to help enhance soil conductivity, which can be further enhanced by the release of any electrolytic fill 1004 (FIG. 10) that was present in the outer chamber defined by the installation sleeve section 1900 (similar to outer chamber 1638 of FIG. 16). Installation sleeve section 1900, shown as having a cylindrical tube-like shape, defines a lower end 1904, an upper end 1906, and a sleeve wall 1908 extending between the lower end 1904 and the upper end 1906, with the sleeve wall 1908 defining an outer surface 1910, an inner surface 1912, and a central opening 1914, though other shapes having a central opening are contemplated as being within the scope of the present disclosure. Proximate the lower end 1904, sleeve wall 1908 can flare radially outwardly to form a flange 1916, which can promote a modular approach in constructing a sleeve to complete an electrode assembly. The flange 1916 can be formed during the manufacture of the installation sleeve section 1900 such that the installation sleeve section 1900, including the flange 1916, is a one-piece component. Other suitable methods of attaching or incorporating the flange 1916 can be used in other aspects.

The installation sleeve section 1900 can be provided in two-foot lengths, or other suitable lengths, including lengths shorter than the length of a one-piece installation sleeve in most completed electrical grounding systems. At the installation site, such sleeve sections can be stacked atop one another when electrical grounding systems deeper than, for instance, two feet, are possible or desired. In such an arrangement, an unflared end of one installation sleeve section 1900 fits within the flange of another installation sleeve section to provide for a snug fit between the sections. Each installation sleeve section 1900 can have a plurality of weep holes 1918 extending from the outer surface 1910 through the sleeve wall 1908 to the inner surface 1912. Once electrolytic fill has been added to the outer chamber defined by one or more assembled installation sleeve sections 1900 (see, for example, outer chamber 1638 of FIG. 16), the electrolytic fill 1004 (FIG. 10) leaches from the outer chamber, through the weep holes 1918, and into backfill material surrounding the sleeve section 1900 in its installed state. FIG. 19A illustrates the weep holes 1918 arranged in axially-spaced circumferential rows, though other patterns can be used, as demonstrated in the disclosure of FIG. 19B, discussed below.

FIG. 19B depicts another aspect of the present disclosure, illustrating an installation sleeve section 1905, with primed numerals in FIG. 19B identifying the same components corresponding to the same numerals in an unprimed form in FIG. 19A. A plurality of weep holes 1918' can be formed into the sleeve wall 1908' in the same manner discussed with regard to the sleeve wall 1908 of FIG. 19A, except that FIG. 19B shows that the plurality of weep holes 1918' can form a pattern different from that depicted in FIG. 19A. As shown in FIG. 19B, the plurality of weep holes 1918' can form a diagonal, or spiral, progression across the sleeve wall 1908'. FIG. 19B also shows a disc member 1920, which can be comprised of the same electrolytic compound material comprising installation sleeve section 1905. Disc member 1920 can be used in place of the plate section 1724 of base member 1722, shown in FIG. 17, to form a bottom retention of the electrolytic fill within the outer chamber of a completed electrical grounding system. Finally, FIG. 19B shows that a flange 1916' can be formed proximate the upper end 1906' of the installation sleeve section 1900', rather than proximate the lower end, as in FIG. 19A.

The composition of any installation sleeve constructed according to FIG. 19A or 19B can, in various implementations, be a mixture of water, peat moss, Attapulgite clay, electrolytic fill as described above, and carbon fibers. Peat moss, commercially available from suppliers such as Home Depot, can be used because it has been found to be an effective electrical conductor and possesses hydrophilic properties. Hydrophilic properties can be desirable for promoting adhesion of peat moss together upon the addition of water. Attapulgite clay is named after Attapulgus, Ga., from which the clay is mined. A cell of Attapulgite clay is elongated, with a plurality of indentations formed along its length. Upon the introduction of water, water molecules can become lodged in the indentations, thus making Attapulgite clay an excellent substance for enhancing hydrophilic properties of the sleeve material resulting from the steps below. Those properties allow the Attapulgite clay to function as an emulsifier such that Attapulgite clay promotes adhesion of several sleeve material components together. However, the disclosure of Attapulgite clay should not be considered limiting on the disclosure, as other clays or other materials with desirable hydrophilic properties can be used in other aspects. The carbon fiber can enhance the sturdiness of the sleeves formed from the sleeve material.

In various aspects, the manufacture of the installation sleeve material can proceed according to the numbered steps below. In other aspects, the precise measurements and time durations provided below should not be considered limiting on the present disclosure, and other measurements or durations can be used in other aspects to manufacture the installation sleeves disclosed herein.

Step 1: Sift peat moss through standard window screen to remove twigs, and provide a uniform "powder" material.

Step 2: Grind the electrolytic fill in a commercial grinder, so that it has a consistency approaching that of, for example, espresso coffee.

Step 3: Blend the ground electrolytic fill and the Attapulgite clay together, then add the peat moss and blend, then add the carbon fiber and blend further. Continue blending until the mixture is completely uniform.

Step 4: Add water gradually until desired consistency and uniformity is achieved. In various aspects, the weight of water can be about twice the weight of the dry ingredients after the desired consistency and uniformity is achieved. Blend thoroughly.

Step 5: Roll or extrude the blended material into sheets 20 cm wide, 46 cm long, and 0.3 cm thick.

Step 6: Punch a line of 3 cm diameter holes into each sheet along the longitudinal axis, spaced every 10 cm.

Step 7: Lay two strips of copper screening 3 cm by 45 cm above and below the punched holes.

Step 8: Brush on a coating of "slip," which can be a watered-down version of the sleeve material. Also called a slurry, slip is made by suspending solids in water. Normally these are ceramic or mineral solids with very fine particles, and can be kept in suspension using small amounts of chemical compounds.

Step 9: Press another extruded sheet (without copper) onto the slip-coated sheet and ensure a complete bond.

Step 10: Wrap the material onto an inflated mandrel, using slip and pressure to join the seams.

Step 11: Assemble two additional sheets onto the inflated mandrel and slip-join the seams to the adjacent sheets.

Step 12: Mold a flange (of the shape discussed above with regard to FIGS. 19A and 19B) onto the top of the third sheet of material wrapped onto the mandrel. The flange can be formed with a mold pressed onto the mandrel.

Step 13: Dry the mandrel-mounted sheets (now including the flange) in a heated chamber or room, generally for 2-3 hours.

Step 14: Deflate and remove the mandrel, placing the formed 60 cm-long sleeves, flange end up, vertically on drying racks with support rings to prevent sagging during drying.

Step 15: Forced air dry the sleeves for 24 hours, using more or less time depending on atmospheric conditions.

Figure 20:
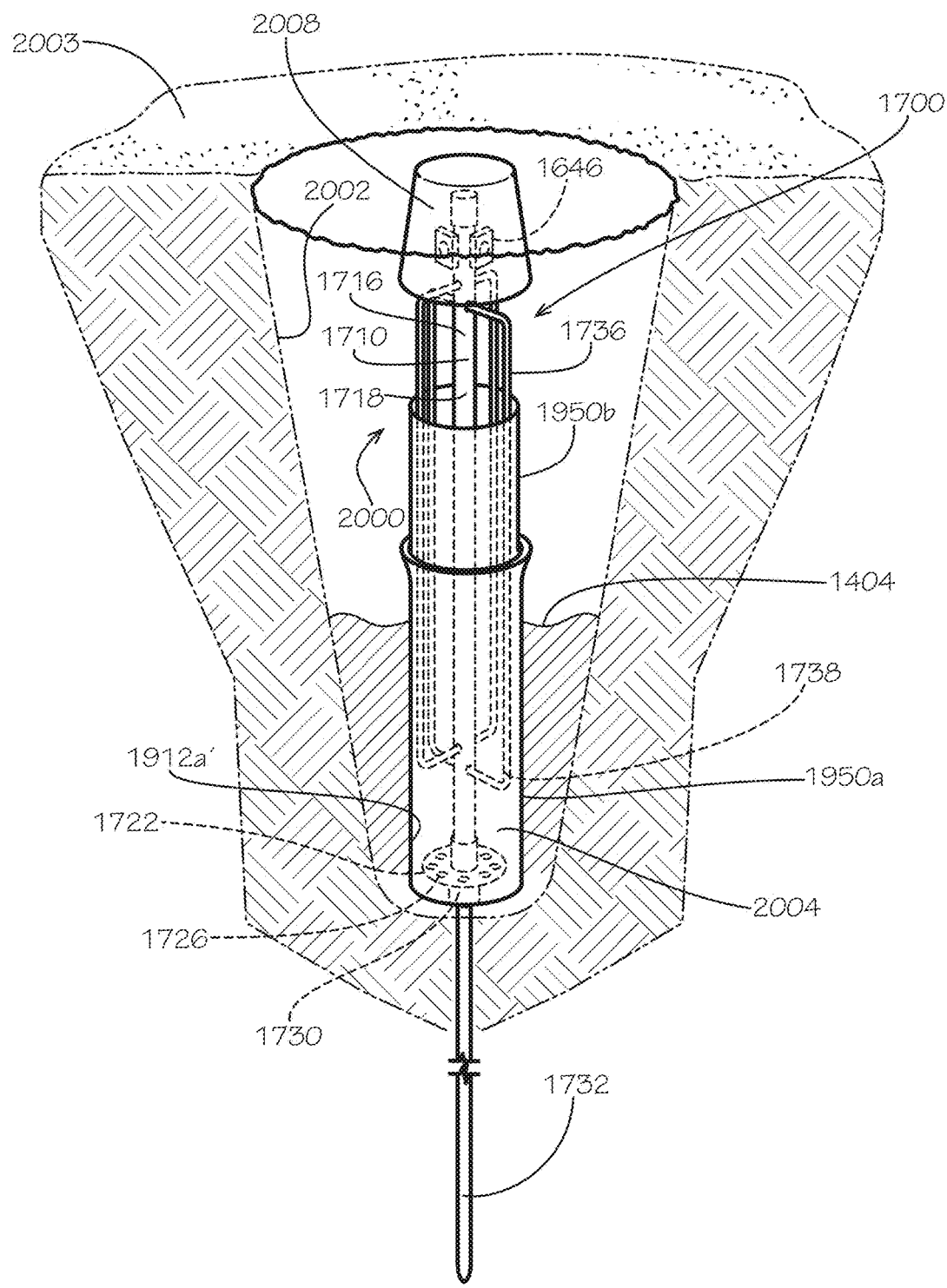
FIG. 20 is a perspective view of an example of an installed electrical grounding system inserted within a hole formed in soil, shown in a sectional view, the system comprising the electrode assembly of FIG. 17 and installation sleeve sections of the type illustrated in FIG. 19A.

FIG. 20 is a perspective view of an installed electrical grounding system 2000 inserted within a hole 2002 formed in native soil 2003, shown in a sectional view, the electrical grounding system 2000 comprising the electrode assembly 1700 illustrated in FIG. 17 and an arrangement of installation sleeve sections 1950a, 1950b constructed as shown in FIG. 19B, with part of sleeve section 1950b broken away to expose the electrode frame 1736. Installation sleeve sections 1950a, 1950b can be stacked end-to-end in the manner described with regard to FIG. 19A. For ease of illustration, no weep holes are shown in the installation sleeve sections 1950a, 1950b, or in the hollow electrode 1710, but it will be understood that weep holes, exemplified in FIG. 17 at 1720, and in FIGS. 19A and 19B at 1918 and 1918', respectively, are present in the hollow electrode 1710 and in the installation sleeve sections 1950a, 1950b.

To fully install electrical grounding system 2000 at a grounding site, the hole 2002 can be dug or otherwise formed into the soil 2003 with a tool, such as a driving rod, that permits determination of hole depth and thus, of soil depth available for electrical grounding. If more than one electrical grounding system 2000 is going to be needed, the hole 2002 can be formed or extended into a trench of predetermined length such as four feet, for two electrical grounding systems 2000. Next, based on that determination, ground member 1732 can be selected from a plurality of available ground members having different lengths. The selected ground member 1732 can then be driven into soil 2003 beneath the hole 2002. Next, the ground member 1732 is removably attached to the electrode assembly 1700 by engagement of the externally-threaded upper end 1734 (shown in FIG. 18) with the internally-threaded lower base bushing 1730, in the manner discussed with regard to FIG. 17. One or more installation sleeve sections, such as 1950a, 1950b, can then be positioned into the hole 2002 so as to surround the electrode assembly 1700, with the lowermost installation sleeve section 1950*a* contacting the base 1722 of the electrode assembly 1700 or otherwise contacting a bottom of the hole 2002. An annular-shaped outer chamber 2004 can thereby be formed between the electrode wall exterior surface 1718 and the inner surface of each sleeve wall of each installation sleeve section 1900', such as inner surface 1912*a*' of sleeve wall 1950*a*. Each such sleeve section inner surface can then contact at least a portion of the electrode frame 1736 of the electrode assembly 1700. With the installation sleeve sections 1950*a,b* installed as shown in FIG. 20, each sleeve section inner surface can contact at least the axial section of each electrode frame member 1738. The outer chamber 2004 can then be filled with electrolytic fill 1004 (FIG. 10). The electrode assembly 1700 can then be electrically connected to the fault current source 11 (FIG. 1) and, if needed, to one or more additional electrical grounding assemblies, in the manner discussed with regard to FIG. 1, with bonding lug 1646, attached to the exterior surface 1718, serving as the cable connection for the electrode assembly 1700. The hole 2002 (or trench, if more than one electrical grounding system is used) can then be backfilled with backfill material 1404. Only a partial backfilling is shown for ease of illustration, but it will be understood that backfill material 1404 will be filled in the hole 2002 to a level just below the elevation of the bonding lugs 1646. A protective enclosure with labeling (reciting the words "Grounding System," for instance), such as valve box 2008, can then be positioned over the cap 1712 of the electrode assembly 1700.

With the electrical grounding system 2000 installed as shown in FIG. 20, fault current is routed and dispersed not only in the manner discussed with regard to FIG. 1, but also through the electrode frame 1736. When fault current travels through the electrode wall 1716, a portion of that current can be transmitted through each electrode frame member 1738. Since the axial section of each electrode frame member 1738 at least partially contacts the inner surface of a sleeve wall of each installation sleeve section (such as inner surface 1912*a*'), each frame member 1738 transmits fault current through each sleeve wall (such as wall 1908' in FIG. 19B), and into the surrounding backfill material 1404 which, in turn, disperses the transmitted fault current to the surrounding native soil 2003.

Still referring to FIG. 20, the electrolytic properties of conducting media associated with the electrical grounding system 2000 can be enhanced or replenished. If electrolytic salt is inserted into the inner chamber of the hollow electrode 1710, the electrolytic salt can pass from the inner chamber, through the weep holes 1720 (FIG. 17), and into the electrolytic fill 1004 (FIG. 10) present in the outer chamber 2004. Electrolytic properties of the backfill material 1404 can likewise be augmented. Due to the presence of the weep holes in each installation sleeve section (such at 1918' in FIG. 19B), the electrolytic fill 1004 can leach from the outer chamber 2004, through those weep holes 1918', and into the backfill material 1404. The electrolytic properties of the native soil 2003 beneath the base 1722 can also be enhanced. Due to the presence of the apertures 1726 in the plate section 1724 (FIG. 17) of the base 1722, the electrolytic fill 1004 can leach from the outer chamber 2004, through each of those apertures 1726, and into the native soil 2003.

Figure 21:
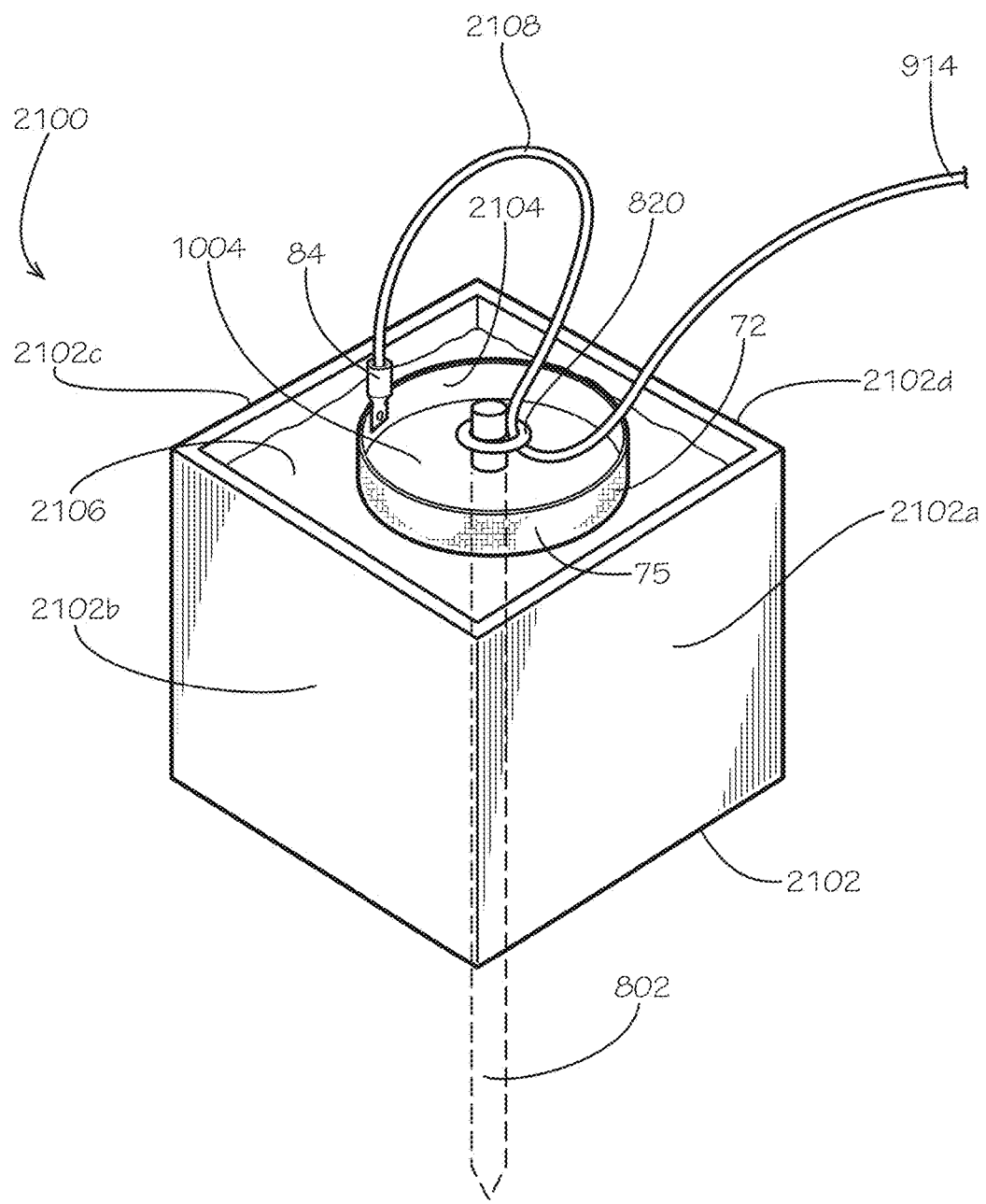
FIG. 21 is a perspective view of an electrical grounding system according to another aspect of the present disclosure.

FIG. 21 illustrates an electrical grounding system 2100 reflecting a more rudimentary implementation than those discussed above. Reference numerals used in this FIG. 21 description that were previously recited in descriptions of various preceding figures above identify components identical to those described with regard to such preceding figures. System 2100 comprises a containment box 2102 constructed of any suitable nonconductive material, such as plywood, sitting atop a native soil ground level. The sides 2102*a,b,c,d* of the containment box 2102 define an interior space, with an electrically conductive column 2104 centrally positioned therein. The electrically conductive column 2104 can be constructed substantially identically to either of the tube sections 76, 78 of FIG. 4, but having an axial length coterminous with the height of the containment box 2102. The electrically conductive column 2104 can also be constructed as a 5-inch diameter copper tube, though other suitable conductive materials can be used. Carbon fiber fabric 72, shown contacting and wrapped around the electrically conductive column 2104, can have a length identical to axial length of the electrically conductive column 2104. A ground rod 802, centrally disposed within internal space defined by the electrically conductive column 2104, extends into native soil to a depth such as, for example, two feet. Electrolytic fill 1004, which can be in paste form, occupies the annular space between an exterior surface of the ground rod 802 and the inner surface of the electrically conductive column 2104. An acorn clamp 820 can be attached to an upper portion of the ground rod 802, in the manner described with regard to FIG. 8, above. Damp peat moss 2106 can occupy the space defined between the box sides 2102*a,b,c,d* of containment box 2102 and the exterior face 75 of the carbon fiber fabric 72. The damp peat moss 2106, as mentioned above with regard to FIGS. 19A and 19B, is an effective electrical conductor and possesses hydrophilic properties.

Regarding electrical connections to the electrical grounding system 2100, a column lug 84 can be attached to the electrically conductive column 2104 by any suitable means, such as riveting, that permits electrical communication between the electrically conductive column 2104 and the column lug 84. A fault current supply cable 914 connects to a fault current source (not shown) at one end, with its opposite end contacting the ground rod 802 and held in place by the acorn clamp 820. A jumper lead 2108 can be received in the column lug 84 at one end, with its other end also contacting the ground rod 802 and held in place by the acorn clamp 820. In other implementations, the fault current supply cable 914 and the jumper lead 2108 can comprise a single line. Fault current received by the ground rod 802 from the fault current supply cable 914 is dispersed both axially downwardly and radially outwardly from the ground rod 802. The portion of the received fault current that is dispersed axially downwardly travels down through the ground rod 802 and into the native soil located beneath the lower, embedded end of the ground rod 802. The portion of the received fault current that is dispersed radially outwardly from the ground rod 802 travels radially through the electrolytic fill 1004, whereafter it is further dispersed by the outer face 75 of the carbon fiber fabric 72 into the damp peat moss 2106, which conducts the current radially away from outer face 75. Thus, even a rudimentary implementation of a grounding system according to an aspect of the present disclosure can disperse fault current in both axial and radial directions, with the radial dispersion significantly increased by the action of the carbon fiber fabric 72 in conjunction with the electrolytic fill 1004 and the damp peat moss 2106.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, can be executed out of order from that shown or discussed, including substantially concurrently or in reverse order, depending on the functionality involved, as would be understood by those reasonably skilled in the art of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An electrical grounding system, comprising:
   an electrically conductive column configured for communication with a fault current source, wherein the electrically conductive column comprises an open-ended copper tube;
   carbon fiber fabric assembled onto at least a portion of the electrically conductive column, the carbon fiber fabric having a conductive relationship with least a portion of the electrically conductive column; and
   a salt replenishment tube configured for attachment to a ground member, the salt replenishment tube having a tube wall defining an interior surface and an exterior surface, the interior surface of the tube wall defining a tube chamber, wherein the tube wall defines a weep hole extending from the exterior surface of the tube wall, through the tube wall, and into the tube chamber;
   wherein upon installation of the electrically conductive column in a hole into which a ground member has been driven, a column chamber is defined between an interior surface of the electrically conductive column, the exterior surface of the salt replenishment tube, and an exterior surface of the ground member, and
   wherein the electrical grounding system further comprises electrolytic fill disposed within the column chamber, the electrolytic fill comprising a material configured to conduct at least a portion of any fault current received by the ground member radially outwardly from the ground member, though the column chamber, and to the carbon fiber fabric.

2. The electrical grounding system of claim 1, wherein the carbon fiber fabric comprises a plain weave fabric.

3. The electrical grounding system of claim 1, wherein
   the electrically conductive column has an exterior surface, a cross-section of the electrically conductive column defining a perimeter of the exterior surface; and
   the carbon fiber fabric surrounds the perimeter.

4. The electrical grounding system of claim 1, wherein the electrically conductive column defines a column wall and a fill hole formed into the column wall, and wherein the electrically conductive column is configured for placement into native soil in a horizontal position.

5. The electrical grounding system of claim 1, further comprising electrolytic salt disposed within the tube chamber, wherein the weep hole is configured to provide a passageway for the electrolytic salt, during use of the system, to leach from the tube chamber and into a column chamber at least partially defined by the electrically conductive column.

6. The electrical grounding system of claim 1, wherein the electrolytic fill comprises a composition of bentonite clay, copper sulfate, gypsum, and magnesium sulfate, with bentonite clay comprising at least 50% of the composition.

7. The electrical grounding system of claim 1, wherein the electrically conductive column has an end, the electrical grounding system further comprising:
   a bus bar comprising a first bus bar connector, a second bus bar connector, and a third bus bar connector, the bus bar electrically interconnecting each of the bus bar connectors to one another;
   wherein the bus bar electrically communicates with the electrically conductive column and with the fault current source.

8. The electrical grounding system of claim 7, further comprising:
   a first column lug, a second column lug, and a third column lug, each of the column lugs attached to, and in electrical communication with, the electrically conductive column proximate the end;
   a first lead, one end of the first lead communicating with the first column lug and another end of the first lead communicating with the first bus bar connector;
   a second lead, the second lead threaded through the second bus bar connector, one end of the second lead communicating with the second column lug, and another end of the second lead communicating with the third column lug; and
   a ground member clamp engageable with an upper portion of a ground member;
   wherein the third bus bar connector and the ground member clamp are configured to permit a fault current supply cable to contact the ground member clamp, to be routed through the third bus bar connector, and to then exit the electrical grounding system.

9. The electrical grounding system of claim 8,
   further comprising an enclosure positioned over the electrically conductive column, the enclosure having a lower rim defining an opening extending axially upwardly, the opening providing a passage configured to allow the fault current supply cable to be routed to the ground member clamp, through the third bus bar connector, and back out of the enclosure to another electrical grounding system;

wherein the bus bar is attached to an inner surface of the enclosure.

10. The electrical grounding system of claim 1, further comprising a support lattice positioned circumferentially between the electrically conductive column and at least a portion of the carbon fiber fabric.

11. The electrical grounding system of claim 10, wherein the support lattice comprises:
an upper ring positioned circumferentially around one portion of the electrically conductive column;
a lower ring axially spaced from the upper ring, the lower ring positioned circumferentially around another portion of the electrically conductive column; and
an elongated member defining an inner surface and an outer surface, the inner surface of the elongated member connected to the upper ring proximate one end of the elongated member, and the inner surface of the elongated member connected to the lower ring proximate another end of the elongated member.

12. The electrical grounding system of claim 1, wherein the open-ended copper tube comprises an upper tube section, and wherein the electrically conductive column further comprises:
a lower tube section; and
a spine having opposed ends, one end of the spine connected to the upper tube section, and another end of the spine connected to the lower tube section;
wherein the spine electrically interconnects the upper tube section to the lower tube section.

13. The electrical grounding system of claim 12, further comprising a support lattice positioned circumferentially around the upper tube section and the lower tube section internally of the carbon fiber fabric.

14. The electrical grounding system of claim 13, wherein the support lattice comprises:
an upper ring positioned circumferentially around the upper tube section;
a lower ring positioned circumferentially around the lower tube section; and
an elongated member defining an inner surface and an outer surface, the inner surface of the elongated member connected to the upper ring proximate one end of the elongated member, and the inner surface of the elongated member connected to the lower ring proximate another end of the elongated member;
whereby the carbon fiber fabric contacts at least a portion of the outer surface of the elongated member, at least a portion of the upper tube section, and at least a portion of the lower tube section.

15. The electrical grounding system of claim 1, wherein the open-ended copper tube comprises a first electrically conductive tube having a first end, and wherein the electrically conductive column further comprises a second electrically conductive tube, the second electrically conductive tube having a second end in electrical communication with the first end.

16. The electrical grounding system of claim 15, wherein the first end is inwardly tapered, the second end is outwardly tapered, and the second end is press fit over the first end.

17. The electrical grounding system of claim 16, further comprising:
an upper connection lug connected to the first electrically conductive tube proximate the first end;
a lower connection lug connected to the second electrically conductive tube proximate the second end; and
a cable member electrically interconnecting the upper connection lug and the lower connection lug.

18. An electrical grounding system kit, comprising:
a hollow electrode comprising
an open-ended electrically conductive copper tube configured for communication with a fault current source, and
carbon fiber fabric assembled onto at least a portion of the open-ended electrically conductive copper tube;
a predetermined quantity of electrolytic fill; and
a bus bar comprising at least two bus bar connectors electrically interconnected to one another.

19. The electrical grounding system kit of claim 18, further comprising:
a first lug, a second lug, and a third lug attached to and in electrical communication with the open-ended electrically conductive copper tube proximate an end of the open-ended electrically conductive copper tube;
a first lead attached at one end to the first lug; and
a second lead, the second lead threaded through one of the bus bar connectors, one end of the second lead connected to the second lug, and another end of the second lead connected to the third lug.

20. The electrical grounding system kit of claim 18, further comprising a salt replenishment tube assembly positioned inside the hollow electrode during shipment of the electrical grounding system kit, the salt replenishment tube assembly comprising:
a salt replenishment tube having opposed ends and a tube wall defining an interior surface and an exterior surface, the interior surface defining a tube chamber, wherein the tube wall defines a weep hole extending from the exterior surface of the tube wall, through the tube wall, and into the tube chamber;
electrolytic salt disposed within the tube chamber;
a cap received on each end of the salt replenishment tube to retain the electrolytic salt within the tube chamber; and
water-soluble tape placed over the weep hole, the water-soluble tape configured to prevent escape of the electrolytic salt out of the tube chamber through the weep hole during shipment;
whereby the salt replenishment tube assembly is configured such that, during use of the electrical grounding system, the water-soluble tape dissolves over time to allow the electrolytic salt to leach from the tube chamber, through the weep hole, and into space external to the salt replenishment tube.

21. The electrical grounding system kit of claim 18, further comprising a container containing a predetermined quantity of bentonite clay granules.

22. The electrical grounding system kit of claim 18, further comprising a ground member clamp.

23. The electrical grounding system kit of claim 18, further comprising an inter-system bonding termination block.

24. An electrical grounding system, comprising:
an electrically conductive column configured for communication with a fault current source;
a carbon fiber layer in conductive relationship with least a portion of the electrically conductive column; and
a salt replenishment tube configured for positioning within the electrically conductive column, the salt replenishment tube having a tube wall defining an exterior surface;
wherein the electrically conductive column defines a column wall and a fill hole formed into the column wall, and wherein the electrically conductive column is configured for placement into native soil in a horizontal position;

wherein upon installation of the electrically conductive column in a hole into which a ground member has been driven, a column chamber is defined between an interior surface of the electrically conductive column, the exterior surface of the salt replenishment tube, and an exterior surface of the ground member, and wherein the electrical grounding system further comprises electrolytic fill disposed within the column chamber, the electrolytic fill comprising a material configured to conduct at least a portion of any fault current received by the ground member radially outwardly from the ground member, though the column chamber, and to the carbon fiber layer.

25. The electrical grounding system of claim 24, wherein the electrolytic fill comprises a composition of bentonite clay, copper sulfate, gypsum, and magnesium sulfate, with bentonite clay comprising at least 50% of the composition.

26. An electrical grounding system, comprising:
   an electrically conductive column configured for communication with a fault current source; and
   a carbon fiber layer in conductive relationship with least a portion of the electrically conductive column; and
   a bus bar comprising a first bus bar connector, a second bus bar connector, and a third bus bar connector, the bus bar electrically interconnecting each of the bus bar connectors to one another;
   wherein the bus bar electrically communicates with the electrically conductive column and with the fault current source.

27. The electrical grounding system of claim 26, further comprising:
   a first column lug, a second column lug, and a third column lug, each of the column lugs attached to, and in electrical communication with, the electrically conductive column proximate the end;
   a first lead, one end of the first lead communicating with the first column lug and another end of the first lead communicating with the first bus bar connector;
   a second lead, the second lead threaded through the second bus bar connector, one end of the second lead communicating with the second column lug, and another end of the second lead communicating with the third column lug; and
   a ground member clamp engageable with an upper portion of a ground member;
   wherein the third bus bar connector and the ground member clamp are configured to permit a fault current supply cable to contact the ground member clamp, to be routed through the third bus bar connector, and to then exit the electrical grounding system.

28. The electrical grounding system of claim 27,
further comprising an enclosure positioned over the electrically conductive column, the enclosure having a lower rim defining an opening extending axially upwardly, the opening providing a passage configured to allow the fault current supply cable to be routed to the ground member clamp, through the third bus bar connector, and back out of the enclosure to another electrical grounding system;

wherein the bus bar is attached to an inner surface of the enclosure.

29. An electrical grounding system kit, comprising:
   a hollow electrode comprising
      an electrically conductive tube configured for communication with a fault current source, and
      a carbon fiber layer assembled onto at least a portion of the electrically conductive tube;
   a bus bar comprising at least two bus bar connectors electrically interconnected to one another;
   a first lug, a second lug, and a third lug attached to and in electrical communication with the electrically conductive tube proximate an end of the electrically conductive tube;
   a first lead attached at one end to the first lug; and
   a second lead, the second lead threaded through one of the bus bar connectors, one end of the second lead connected to the second lug, and another end of the second lead connected to the third lug.

30. The electrical grounding system kit of claim 29, further comprising a salt replenishment tube assembly positioned inside the hollow electrode during shipment of the electrical grounding system kit, the salt replenishment tube assembly comprising:
   a salt replenishment tube having opposed ends and a tube wall defining an interior surface and an exterior surface, the interior surface defining a tube chamber, wherein the tube wall defines a weep hole extending from the exterior surface of the tube wall, through the tube wall, and into the tube chamber;
   electrolytic salt disposed within the tube chamber;
   a cap received on each end of the salt replenishment tube to retain the electrolytic salt within the tube chamber; and
   water-soluble tape placed over the weep hole, the water-soluble tape configured to prevent escape of the electrolytic salt out of the tube chamber through the weep hole during shipment;
   whereby the salt replenishment tube assembly is configured such that, during use of the electrical grounding system, the water-soluble tape dissolves over time to allow the electrolytic salt to leach from the tube chamber, through the weep hole, and into space external to the salt replenishment tube.

31. The electrical grounding system kit of claim 30, further comprising a container containing a predetermined quantity of bentonite clay granules.

* * * * *